(12) United States Patent
Cooper et al.

(10) Patent No.: US 10,822,007 B2
(45) Date of Patent: Nov. 3, 2020

(54) CONTROL SYSTEM AND METHOD FOR A TRANSPORTATION NETWORK

(71) Applicant: Transportation IP Holdings, LLC, Norwalk, CT (US)

(72) Inventors: Jared Klineman Cooper, Melbourne, FL (US); Samuel William Golden, Melbourne, FL (US); Robert James Foy, Melbourne, FL (US); David Michael Peltz, Melbourne, FL (US); Nathan Thomas North, Seattle, WA (US); Milan Karunaratne, Orange, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/695,270

(22) Filed: Nov. 26, 2019

(65) Prior Publication Data

US 2020/0094861 A1 Mar. 26, 2020

Related U.S. Application Data

(60) Continuation of application No. 16/289,236, filed on Feb. 28, 2019, now Pat. No. 10,532,755, which is a (Continued)

(51) Int. Cl.
*B61L 27/00* (2006.01)
*B61L 17/00* (2006.01)

(52) U.S. Cl.
CPC .......... *B61L 27/0016* (2013.01); *B61L 17/00* (2013.01); *B61L 27/0022* (2013.01); *B61L 27/0027* (2013.01)

(58) Field of Classification Search
CPC .. B61L 27/0016; B61L 27/0022; B61L 17/00; B61L 27/0027
(Continued)

(56) References Cited

U.S. PATENT DOCUMENTS 6,587,738 B1 * 7/2003 Belcea ................ B61L 27/0027
700/33
9,156,477 B2 * 10/2015 Cooper ................... B61L 3/006
(Continued)

OTHER PUBLICATIONS

Technical Search Report and Written Opinion published in the Official Gazette #2573 dated Apr. 28, 2020 for corresponding Brazilian Patent Application No. BR102015006813-1 (4 pages).
(Continued)

*Primary Examiner* — Muhammad Shafi
(74) *Attorney, Agent, or Firm* — Christopher R. Carroll; The Small Patent Law Group LLC

(57) ABSTRACT

A control system and method determine an energy demand associated with delivery of cargo in a trip. The energy demand represents how much electric energy is needed to move cargo vehicles that carry the cargo through the trip. Locations of energy tenders and states of charge of the energy tenders are determined. A schedule for the cargo vehicles to deliver the cargo to a delivery location within a delivery time slot is determined. This schedule is determined based on the energy demand, the locations of the energy tenders, and the states of charge of the energy tenders. The system and method direct which of the energy tenders that the cargo vehicles are to couple with, be powered by, and move with for powering the cargo along routes to the delivery location of the trip within the designated time slot.

20 Claims, 9 Drawing Sheets

Related U.S. Application Data continuation-in-part of application No. 15/089,574, filed on Apr. 3, 2016, now Pat. No. 10,220,864, which is a division of application No. 14/226,921, filed on Mar. 27, 2014, now Pat. No. 9,327,741.

(58) Field of Classification Search
USPC .......................................................... 701/19
See application file for complete search history.

(56) References Cited

U.S. PATENT DOCUMENTS

| | | | | |
|---|---|---|---|---|
| 2005/0279242 | A1* | 12/2005 | Maier | B60L 7/04 105/26.05 |
| 2007/0219681 | A1* | 9/2007 | Kumar | B61L 3/006 701/19 |
| 2009/0187291 | A1* | 7/2009 | Daum | B61L 3/006 701/2 |
| 2012/0277940 | A1* | 11/2012 | Kumar | B61L 27/0027 701/20 |
| 2013/0144670 | A1* | 6/2013 | Kickbusch | G06Q 10/06 705/7.12 |
| 2013/0171590 | A1* | 7/2013 | Kumar | B61L 3/006 434/62 |
| 2014/0094998 | A1* | 4/2014 | Cooper | B61L 3/006 701/2 |
| 2014/0330460 | A1* | 11/2014 | Schoonmaker | B61C 17/12 701/19 |

OTHER PUBLICATIONS

Examination report No. 1 for corresponding Australian application No. 2015201381 dated Feb. 30, 2020. (4 pages).

\* cited by examiner though the vehicles in other vehicle yards within the transportation network. Thus, a need exists to increase the operation efficiency of the vehicle yards.

CONTROL SYSTEM AND METHOD FOR A TRANSPORTATION NETWORK

CROSS-REFERENCE TO RELATED APPLICATIONS

This application is a continuation of U.S. patent application Ser. No. 16/289,236, filed 28 Feb. 2019, which is a continuation-in-part of U.S. application Ser. No. 15/089,574, filed 3 Apr. 2016 (now U.S. Pat. No. 10,220,864), which is a divisional of U.S. application Ser. No. 14/226,921 filed 27 Mar. 2014 (now U.S. Pat. No. 9,327,741). The entire disclosures of these applications are incorporated herein by reference.

BACKGROUND

A transportation network for vehicle systems can include several interconnected main routes on which separate vehicles travel between locations to deliver or receive payloads. For example, a transportation network may be formed from interconnected railroad tracks with rail vehicles traveling along the tracks. The vehicles may travel according to schedules that dictate where and when the vehicles are to travel within the transportation network. The schedules may be coordinated with each other to arrange for certain vehicles to arrive at various locations in the transportation network at desired times and/or in a desired order.

The transportation network may include a vehicle yard or route hub, such as a rail yard or a distribution warehouse that includes a relatively dense grouping of routes or locations where several vehicles can congregate, deliver payloads, receive new payloads, perform maintenance, refuel, or the like. While in the vehicle yard, vehicles are assigned or paired with payloads based on power or ability of the vehicle to pull to carry the payload regardless on the overall energy or emission efficiency of available vehicles or the availability of vehicles in other vehicle yards within the transportation network. Thus, a need exists to increase the operation efficiency of the vehicle yards.

As more vehicles in transportation networks become electrified (e.g., the vehicles are propelled using electric energy stored onboard the vehicles), the need to accurately calculate and manage the energy stored by the vehicles to complete trips will increase. While existing technologies can assist in planning for the fuel carried by vehicles and the refueling of vehicles to ensure on-time arrival of the vehicles, these technologies are not applicable to the planning of electric energy storage onboard vehicles as refueling a vehicle consumes significantly less time than recharging energy storage devices onboard vehicles. Because refueling of a vehicle can be completed over a significantly shorter time period than recharging a vehicle, the time needed to recharge vehicles may be a more significant factor in the planning of movements of vehicles in a transportation network.

Additionally, vehicles powered by onboard energy storage devices may be more limited in distances that the vehicles can travel on a full charge than fuel-consuming vehicles of the same mass. The shorter travel distances of the onboard-energy-storage vehicles also can significantly impact the planning of movements of the vehicles in the transportation network.

BRIEF DESCRIPTION

In one embodiment, a control system is provided that includes one or more processors configured to determine an energy demand associated with delivery of cargo in each of one or more trips from a starting location to a delivery location within a delivery time slot associated with the trip. The energy demand for each trip is representative of an amount of electric energy needed to move one or more cargo vehicles that carry the cargo in the trip from the starting location to the delivery location of the trip. The one or more processors are configured to determine a location of each of one or more energy tenders and a state of charge of each of the one or more energy tenders. The one or more processors also are configured to determine a schedule for the one or more cargo vehicles to deliver the cargo to the delivery location within the delivery time slot. The schedule is determined based on the energy demand, the location of the one or more energy tenders, and the state of charge of the one or more energy tenders. The one or more processors also are configured to direct which of the energy tenders that the one or more cargo vehicles are to couple with, be powered by, and move with for powering the cargo along one or more routes to the delivery location of the trip within the designated time slot.

In one embodiment, a method is provided that includes determining an energy demand associated with delivery of cargo in each of one or more trips from a starting location to a delivery location within a delivery time slot associated with the trip. The energy demand for each trip is representative of an amount of electric energy needed to move one or more cargo vehicles that carry the cargo in the trip from the starting location to the delivery location of the trip. The method also includes determining a location of each of one or more energy tenders and a state of charge of each of the one or more energy tenders and determining a schedule for the one or more cargo vehicles to deliver the cargo to the delivery location within the delivery time slot. The schedule is determined based on the energy demand, the location of the one or more energy tenders, and the state of charge of the one or more energy tenders. The schedule directs which of the energy tenders that the one or more cargo vehicles are to couple with, be powered by, and move with for powering the cargo along one or more routes to the delivery location of the trip within the designated time slot. The method also includes directing movement of the one or more cargo vehicles according to the schedule.

In one embodiment, a control system is provided that includes one or more processors configured to determine an energy demand associated with delivery of cargo in each of one or more trips to a delivery location within a delivery time slot associated with the trip. The energy demand for each trip is representative of an amount of electric energy needed to power one or more cargo vehicles that carry the cargo in the trip to self-propel the one or more cargo vehicles from the starting location to the delivery location of the trip. The one or more processors are configured to determine a location of each of one or more energy tenders and a state of charge of each of the one or more energy tenders. The one or more processors are configured to determine a schedule for at least one of the trips to deliver the cargo to the delivery location within the delivery time slot. The schedule is determined based on the energy demand of the at least one trip, the location of at least one of the energy tenders, and the state of charge of the at least one energy tender. The schedule includes a location where the one or more energy tenders that are coupled with the one or more cargo vehicles are to stop for recharging an energy storage device onboard at least one of the energy tenders. The one or more processors are configured to communicate the schedule to the one or more cargo vehicles to direct self-propelled movement of the one or more cargo vehicles to move to a location of the one or more energy tenders, couple with the one or more energy tenders, and receive electric power from the one or more energy tenders for powering the one or more cargo vehicles to self-propel along one or more routes to the delivery location of the trip within the designated time slot.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
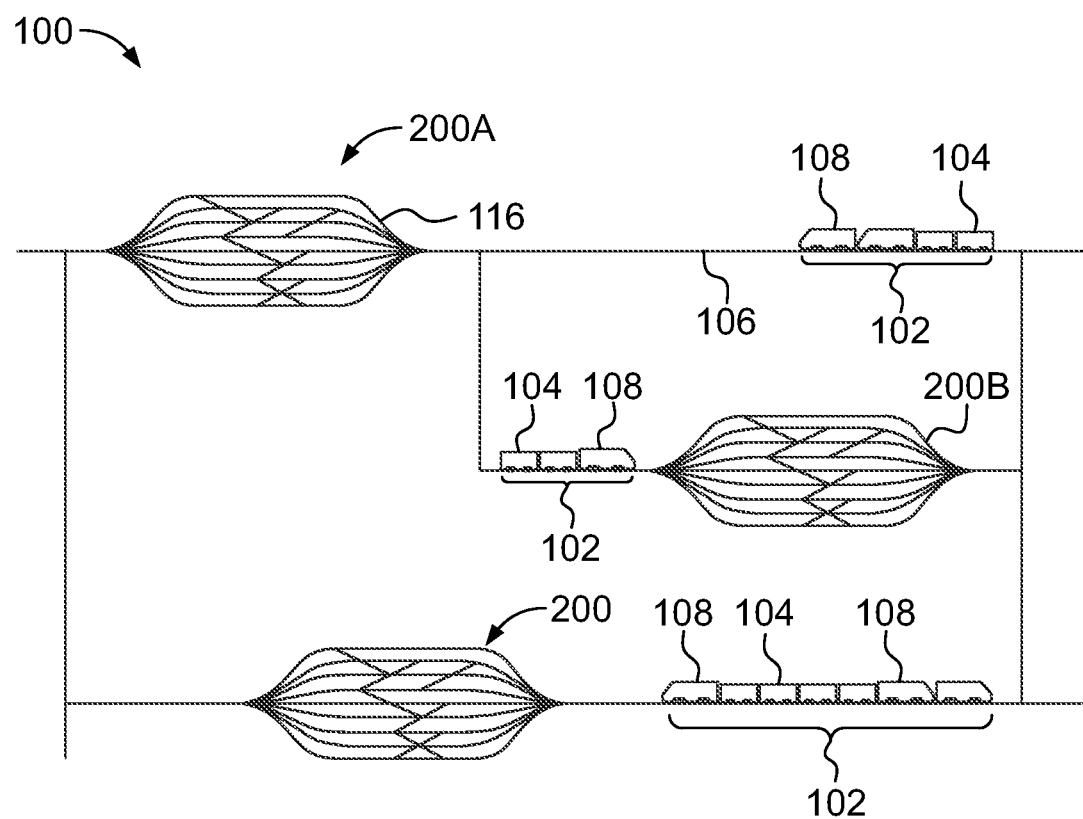
FIG. 1 is a schematic diagram of a transportation network of an embodiment.

One or more embodiments herein described provide systems and methods for coordinating a selection of one or more propulsion-generating vehicles (PGV) for forming a vehicle system having one or more cargo-carrying vehicles (CCV). The PGV may be traveling to (e.g., heading inbound to) a vehicle yard (e.g., for repair and/or maintenance of the PGV, to obtain additional fuel, to unload cargo and/or CCV off of another vehicle system, to load cargo and/or CCV onto the PGV to form the vehicle system, to sort the PGV among other PGV, or the like) or be stored within or at the vehicle yard. The vehicle yard may act as a transportation hub within a transportation network, such as when the vehicle yard is coupled with several routes extending away from the vehicle yard for the vehicle system to travel along to reach other destinations. The vehicle yard may be a final destination location of a trip of the vehicle system, or may be an intermediate location as a stopping off point when the vehicle system is traveling to another business destination (e.g., the destination to which the vehicle system is contracted to travel).

The vehicle yard may have a capacity to receive vehicle systems into the vehicle yard. This capacity can be a space limitation on the number of vehicle systems that can exit off of a main line route into the vehicle yard. Additionally or alternatively, the capacity can be a throughput limitation on the number of vehicle systems the vehicle yard can partition (e.g., removing or separating the CCV or PGV from the vehicle system) or form (e.g., coupling the CCV or PGV into the vehicle system). As vehicle systems come and go from the vehicle yard, the availability or amount of PGV to select from to form alternative configurations of the vehicle systems with the one or more CCV changes. The travel and/or amount of the vehicle systems into the vehicle yard may be controlled such that the vehicle system arrives at the vehicle yard when the vehicle yard has sufficient capacity (e.g., space) to receive the vehicle system. Alternatively, in an embodiment, the vehicle system may be instructed to slow down as the vehicle system is traveling toward the vehicle yard, due to capacity restraints of the vehicle yard, so that an alternative vehicle system having a higher priority, respectively, may arrive or be received into the vehicle yard. The vehicle system may be instructed to slow down when doing so does not have a significantly negative impact (e.g., the impact is below a designated threshold) on the flow of traffic within a transportation network formed from interconnected routes, including the route on which the vehicle travels toward the vehicle yard.

While the discussion and figures included herein may be interpreted as focusing on rail yards as vehicle yards and rail vehicle consists (e.g., trains) as the vehicle systems, it should be noted that not all embodiments of the subject matter herein described and claimed herein are limited to rail yards, trains, and railroad tracks. (A consist is a group of vehicles that are mechanically linked to travel together.) The inventive subject matter may apply to other vehicles, such as airplanes, ships, or automobiles or the like. For example, one or more embodiments may select which airplane is selected to depart with a payload from an airport, a shipping facility (e.g., where the airplane drops off and/or receives cargo for delivery elsewhere), a repair or maintenance facility, or the like. Other embodiments may apply to control which ship is selected to depart with a payload from a shipyard or dock, which semi or delivery truck departs a repair facility, a shipping or distribution facility (e.g., where the automobile picks up and/or drops off cargo to be delivered elsewhere), or the like.

FIG. 1 is a schematic diagram of an embodiment of a transportation network 100. The transportation network 100 includes a plurality of interconnected routes 106, such as railroad tracks, roads, ship lanes, or other paths across which a vehicle system 102 travels. The routes 106 may be referred to as main line routes when the routes 106 provide paths for the vehicle systems 102 to travel along in order to travel between a starting location and a destination location (and/or to one or more intermediate locations between the starting location and the destination location). The transportation network 100 may extend over a relatively large area, such as hundreds of square miles or kilometers of area. While only one transportation network 100 is shown in FIG. 1, one or more other transportation networks 100 may be joined with and accessible to vehicles traveling in the illustrated transportation network 100. For example, one or more of the routes 106 may extend to another transportation network 100 such that vehicles can travel between the transportation networks 100. Different transportation networks 100 may be defined by different geographic boundaries, such as different towns, cities, counties, states, groups of states, countries, continents, or the like. The number of routes 106 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel, such as flights paths taken by airplanes, roads or highways traveled by automobiles, waterborne shipping paths (e.g., shipping lanes) taken by ships, or the like.

Several vehicle systems 102 travel along the routes 106 within the transportation network 100. The vehicle systems 102 may concurrently travel in the transportation network 100 along the same or different routes 106. Travel of one or more vehicle systems 102 may be constrained to travel within the transportation network 100. Alternatively, one or more of the vehicle systems 102 may enter the transportation network 100 from another transportation network or leave the transportation network 100 to travel into another transportation network. In the illustrated embodiment, the vehicle systems 102 are shown and described herein as rail vehicles or rail vehicle consists. However, one or more other embodiments may relate to vehicles other than rail vehicles or rail vehicle consists. For example, the vehicle systems described herein can represent other off-highway vehicles (e.g., vehicles that are not designed or permitted to travel on public roadways), marine vessels, airplanes, automobiles, and the like. While three vehicle systems 102 are shown in FIG. 1, alternatively, a different number of vehicle systems 102 may be concurrently traveling in the transportation network 100 (e.g., more than three, less than three).

Each vehicle system 102 may include one or more PGV 108 (e.g., locomotives or other vehicles capable of self-propulsion) and/or one or more CCV 104. The CCV 104 is a non-propulsion-generating vehicle, such as cargo cars, passenger cars, or other vehicles incapable of self-propulsion. The PGV 108 and the CCV 104 are mechanically coupled or linked together forming a vehicle system 102 (e.g., a consist) to travel or move along the routes 106. The routes 106 are interconnected to permit the vehicle systems 102 to travel over various combinations of the routes 106 to move from a starting location to a destination location and/or an intermediate location there between.

Figure 2:
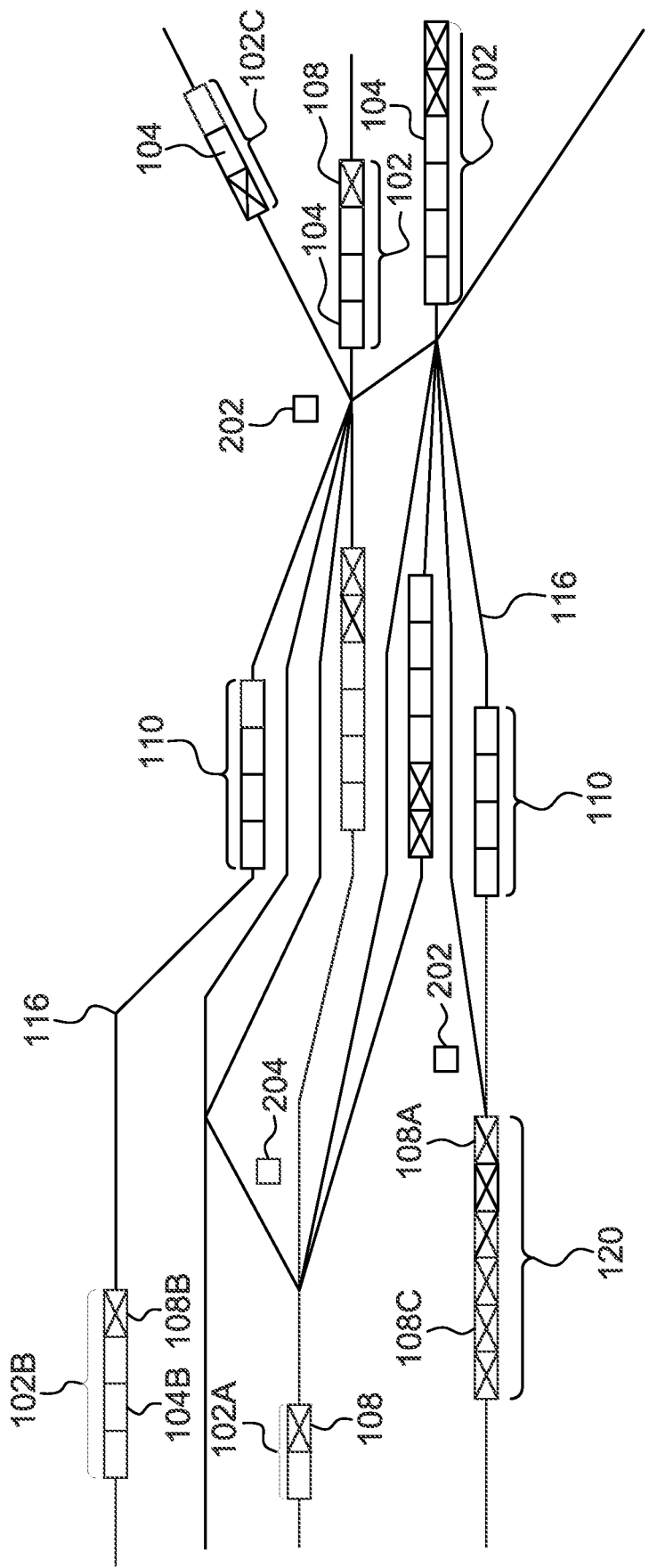
FIG. 2 is a schematic diagram of a vehicle yard in accordance with an embodiment.

The transportation network 100 includes one or more vehicle yards 200. While three vehicle yards 200 are shown, alternatively, the transportation network 100 may include a different number of vehicle yards 200. FIG. 2 is a schematic diagram of a vehicle yard 200 of the transportation network 100 having a control system 150 in accordance with an embodiment. The vehicle yard 200 is shown with a plurality of interconnected routes 116 that are located relatively close to each other. For example, the routes 116 in the vehicle yard 200 may be closer together (e.g., less than 10, 20, or 30 feet or meters between nearby routes 116) than the routes 106 outside of the vehicle yards 200 (e.g., more than several miles or kilometers between nearby routes 116). The number of interconnected routes 116 shown in FIG. 2 is meant to be illustrative and not limiting on embodiments of the described subject matter.

The vehicle yards 200 are located along the routes 106 in order to provide services to the vehicle systems 102, such as to repair or maintain the one or more PGV 108 (illustrated as a rectangle with an X in FIG. 2), re-order the sequence of vehicle systems 102 traveling along the routes 106 by adjusting an order to which the vehicle systems 102 exits the vehicle yard 200 relative to the order of the vehicle systems 102 entering vehicle yard 200, partitioning and storing the one or more PGV 108 and/or CCV 104 (illustrated as a rectangle in FIG. 2) of the vehicle system 102, load or couple additional CCV 104 and/or PGV 108 onto the vehicle system 102, or the like. In an embodiment, the vehicle yards 200 are not used as routes to travel from a starting location to a destination location. For example, the vehicle yards 200 may not be main line routes along which the vehicle systems 102 travel from a starting location to a destination location. Instead, the vehicle yards 200 may be connected with the routes 106 to allow the vehicle systems 102 to get off of the main line routes 106 for services described above.

Figure 3:
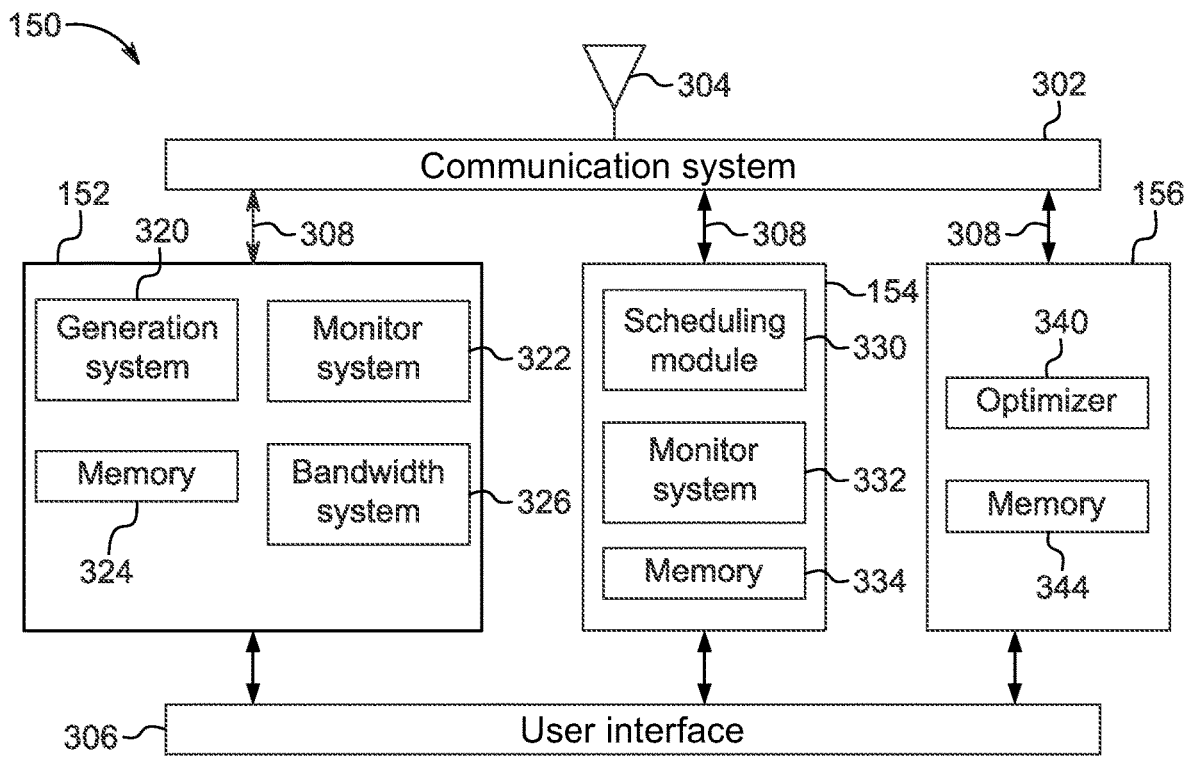
FIG. 3 is a simplified block diagram of an embodiment of a control system.

The services and operations of the rail yard 200 are controlled by the control system 150. The control system 150 includes various systems that perform operations within the vehicle yard 200. For example, as illustrated in FIG. 3, the control system 150 may include a communication system 302, a user interface 306, a yard planner system 152, a scheduling system 154 (also referred to as a control system 154), and an energy management system 156. The yard planner system 152 manages the planned activities within the vehicle yard 200, such as, processing operations that are scheduled to be performed on one or more PGV 108 and/or CCV 104 within the vehicle system 102, receiving the vehicle systems 102 into the yard 200, moving the vehicles (e.g., PGV 108, CCV 104, vehicle systems 102) through the yard 200 (including performing maintenance, inspection, cleaning, loading/unloading of cargo, or the like), and preparing or coupling the one or more PGV 108 and CCV 104 for departing the yard by forming vehicle systems 102 (e.g., consists) which may or may not be the same vehicle system 102 in which the CCV 104 and PGV 108 arrived into the vehicle yard 200. The scheduling system coordinates movement of the vehicle systems 102 within the transportation network 100. The energy management system 156 determines a vehicle configuration for one or more, or each, of the vehicle systems 102. The vehicle configuration can represent a set of one or more selected PGV 108 to be included in the vehicle system 102.

The systems described herein (e.g., systems included in the control system 150 and external to the control system 150) may include or represent hardware and associated instructions (e.g., software stored on a tangible and non-transitory computer readable storage medium (e.g., memory 324, 334 and 344), such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations. Two or more of the systems may share one or more electronic circuits, processors, and/or logic-based devices. In one or more embodiments, the systems described herein may be understood as including or representing electronic processing circuitry such as one or more field programmable gate arrays (FPGA), application specific integrated circuits (ASIC), or microprocessors. The systems may be configured to execute one or more algorithms to perform functions described herein. The one or more algorithms may include aspects of embodiments disclosed herein, whether or not expressly identified in a flowchart or as a step or operation of a method. Various embodiments described herein may be characterized as having different systems/elements (e.g., modules) that include one or more processors. However, it should be noted that the one or more processors may be the same processor or different processors (e.g., each system/element implemented in a separate processor(s), the system/elements all implemented in the same processor(s), or some systems/elements in the same processor(s), and others in different processor(s)).

The yard planner system 152 may include a monitoring system 322. The monitoring system may obtain input information used by the yard planner system 152 to create the yard plans and monitor the yard state information of the vehicle yard 200 and the vehicles (e.g., vehicle systems 102, CCV 104, PGV 108) within the yard 200.

The yard state information may indicate the status of the different vehicles (e.g., vehicle system 102, CCV 104, PGV 108) within the vehicle yard 200, such as where the vehicles currently are located, where the vehicles are expected (e.g., scheduled) to be located at a future time period, what operations are being performed on the vehicles, what resources (e.g., equipment, tools, personnel, or the like) are being expended or used to perform the operations on the vehicles, or the like. The yard state information may be obtained by the monitoring system 322 using messaging (e.g., peer-to-peer messaging) with management information systems, such as system-wide vehicle inventory management systems (that monitor which vehicles are in the yard and/or locations of the vehicles as the vehicles move through the yard), through direct data entry by the operators via the user interface 306. For example, the monitoring system 322 may receive the yard state information from the operator using yard workstations 202 such as computer workstations, tablet computers, mobile phones, and/or other devices through the communication system 302. Additionally or alternatively, some of the yard state information may be received, via the communication system 302, from one or more yard sensors 204 (e.g., include transponders, video cameras, track circuits, or the like) that measure or otherwise obtain data indicative of the yard state information.

Input information may include vehicle connection plans based on a priority and/or selection requests (e.g., for the vehicle system 102, CCV 104, PGV 108) received from the operator (e.g., using the user interface 306) and/or the energy management system 156, the destination locations (e.g., of the vehicle system 102, CCV 104, PGV 108) received from the operator and/or the scheduling system 154, or the like. A vehicle connection plan identifies one or more CCV 104 and/or one or more PGV 108 to be included or coupled to an outbound vehicle system 102 (e.g., vehicle system 102 leaving the vehicle yard 200). Additionally or alternatively, the input information may include primary and secondary vehicle connection plans. The secondary vehicle connection plan may represent one or more additional output vehicle systems 102 that the one or more CCV 104 and/or the one or more PGV 108 may be coupled to or included to if the primary vehicle connection plan is unattainable. Optionally, the vehicle connection plans may include an order, priority list, or timing deadlines, related to the completion of the vehicle connection plan. In an embodiment the priority of the vehicle connection plan correlates to a priority of the vehicle system 102, CCV 104, and/or PGV 108 described below. The priority of the vehicle connection plan instructs the yard planner system 152 on the order of which vehicle system 102 relative to the other vehicle systems to be completed in the yard plan. Optionally, the yard planner system 152 may automatically transmit or signal to the operator within the vehicle yard 200 to direct the coupling to complete the vehicle connection plan of the one or more PGV with the CCV.

For example, the vehicle system 102B enters the vehicle yard 200 having the CCV 104B. The yard planner system 152 receives input information from the scheduling system 154 that the CCV 104B is scheduled for a different destination location than the destination location of the vehicle system 102B. To ensure that the vehicle system 102B and CCV 104B reach the appropriate destination locations, the monitoring system 322 may match an outgoing vehicle system to the CCV 104B having similar destination locations or using the destination location of the outgoing vehicle system as the intermediate location for the CCV 104B. To determine a match, the monitoring system 322 may track the scheduled outbound destination locations of different vehicle systems 102 currently within the vehicle yard 200 or entering the vehicle yard 200 within a predetermined future time period (e.g., two hours before the predetermined departure time of the CCV 104B) by analyzing movement plans or schedule of the vehicle systems 102 from the scheduling system 154. Once the outgoing vehicle system is selected or matched, the yard planner system 152 may create a yard plan or modify an existing yard plan to decouple or partition the CCV 104B from the vehicle system 102B and couple the CCV 104B to the matched outgoing vehicle system.

Additionally or alternatively, if the matched outgoing vehicle system, determined by the monitoring system 322, is not within the vehicle yard 200 (e.g., the matched outgoing vehicle system is not in the yard or is not arriving within a predetermined future time period), the yard planner system 152 may create and/or modify the yard plan to decouple or partition the CCV 104B from the vehicle system 102B and couple the CCV 104B to a CCV group 110 to await coupling with the matched outgoing vehicle system and/or one or more PGV 108 to form the matched outgoing vehicle system. The CCV group 110 may be formed of one or more CCV 104 based on the predetermined departure time of the CCV 104, the destination location or intermediate location of the CCV 104, the type of payload within the CCV 104, selection by the operator of the vehicle yard 200, priority of the CCV 104, communication by a remote vehicle yard, or the like.

In an embodiment, the yard plan may be later modified or adjusted by the yard planning system 152 after the monitoring system 322 receives a PGV change request by the energy management system 156. For example, the monitoring system 322 receives the PGV change request from the energy management system 156 instructing that the vehicle system 102B should be coupled to the PGV 108A and not PGV 108B (e.g., the PGV 108B should be partitioned from the vehicle system 102B). The yard planning system 152 may modify or adjust the yard plan to partition the PGV 108B from the vehicle system 102B and couple the PGV 108A to the vehicle system 102B.

A bandwidth system 326 of the yard planner system 152 monitors constraints on the processing operations that are performed on one or more of the vehicles within the vehicle yard 200 in order to move the vehicle systems into, through, and out of the vehicle yard 200. The bandwidth system 206 may receive data representative of the processing constraints from one or more of the operators, sensors 204, or the like in order to track and/or update the processing constraints over time. The yard plans that are generated by the yard planner system 152 may be updated when the processing constraints change or significantly change such as from route configurations, vehicle inventory, route maintenance, or the like.

For example, the bandwidth system 206 may track route configurations in the yard 200. The route configuration includes the layout (e.g., arrangement, orientations, allowed directions of travel, intersections, or the like) of routes 116 (e.g., tracks) within the vehicle yard 200 on which the vehicles travel and/or are processed in the yard 200. The route configuration also can include the capacities of the routes 116 within the yard 200, such as the sizes of the routes 116 (e.g., lengths). Larger (e.g., longer) stretches of the routes 116 have a larger capacity for receiving vehicles than smaller (e.g., shorter) stretches of the routes 116. These capacities can change with respect to time as the number of vehicles in the yard 200 (and on the routes 116) changes, as segments of the route 116 are unavailable due to maintenance or repair, as segments of the routes 116 become available after being unavailable due to maintenance or repair, or the like.

As another example of processing constraints that can be monitored, the bandwidth system 326 may track vehicle inventories in the vehicle yard 200. Vehicle inventories can represent the locations of various (or all) of the vehicle systems 102, PGV 108 and/or CV 104 within the vehicle yard 200, the intended (e.g., scheduled) locations and/or routes that the vehicles are to occupy and/or travel along in the vehicle yard 200, the current and/or future (e.g., scheduled) status of the processing operations being performed on the various vehicles in the yard, or the like.

A generation system 320 of the yard planner system 152 plans movements of vehicles through the yard and processing activities to be performed on the vehicles to create the yard plan. As described above, the yard plan is a schedule of movements of the vehicles (e.g., vehicle systems 102, CCV 104, PGV 108) through different locations and/or along different routes 116 within the yard 200, as well as a schedule of processing operations to be performed on or with the vehicles at various locations of the vehicles, as the vehicles move from an inbound consist to an outbound consist.

The monitoring system 322 and/or bandwidth system 326 may obtain the information described above via the communication system 302 coupled to or wirelessly communicating with the yard planner system 152. The communication system 302 may include electronic circuitry and other hardware that communicates data signals with the scheduling system 154, the energy management system 156, remote control systems, the yard sensors 204, and/or the yard workstations 202. For example, the communication system 302 may include one or more antennas 304 for wirelessly communicating with the remote control systems, sensors 204, and/or workstations 202. Additionally or alternatively, the communication system 302 may be coupled with conductive communication pathways 308, such as one or more cables, busses, wires, rails, or the like, through which the information can be communicated with, for example, the yard planner system 152, the scheduling system 154, the energy management system 156, the yard sensors 204, and/or the yard workstations 202. As described below, the communication system 302 may send data signals to one or more of the yard workstations 202 to visually present the yard 200 to users of the workstations 202.

The scheduling information obtained by the yard planner system 152 may describe the intended routing and arrival and/or departure times of the vehicle system 102, CCV 104, and/or PGV 108 within the transportation network 100. The scheduling information or the movement plan may be determined or created by the scheduling system 154 coordinating the schedules of the various vehicle traveling within the transportation network 100 and through the vehicle yards 200. The movement plan may include the origin location of the vehicle system 102, CCV 104, and/or PGV 108, the destination location, and/or intermediate locations (e.g., vehicle yards 200). Additionally, the movement plan may list the vehicle yards 200 that the vehicles are to travel to and enter in during each portion (e.g., leg) of travel of the vehicles from the origin location to the respective destination locations. The scheduling system 154 may be disposed at a central dispatch office, within the vehicle yard 200, and/or within the vehicle system 102. The scheduling system 154 may create and communicate the scheduling information to one or more vehicle systems 102, the yard planner system 152, the energy management system 156, or the like through the communication system 302 using a wireless connection (e.g., radio frequency (RF)) or via the conductive communication pathway 308.

The scheduling system 154 includes several modules that perform various operations or functions described herein. The modules may include hardware and/or software systems that operate to perform one or more functions, such as one or more computer processors and/or one or more sets of instructions. The modules shown in FIG. 3 may represent the hardware (e.g., a computer processor) and/or software (e.g., one or more sets of instructions such as software applications or hard-wired logic) used to perform the functions or operations associated with the modules. A single hardware component (e.g., a single processor) and/or software component may perform the operations or functions of several modules, or multiple hardware components and/or software components may separately perform the operations or functions associated with different modules. The instructions on which the hardware components operate may be stored on a tangible and non-transitory (e.g., not a transient signal) computer readable storage medium, such as a memory 334. The memory 334 may include one or more computer hard drives, flash drives, RAM, ROM, EEPROM, or the like. Alternatively, one or more of the sets of instructions that direct operations of the hardware components may be hard-wired into the logic of the hardware components, such as by being hard-wired logic formed in the hardware of a processor or controller.

The scheduling system 154 may include a scheduling module 330 that creates schedules for the vehicle systems 102 within the transportation network 100 and the vehicle yards 200. The scheduling module 330 may form the movement plan, for example, by generating schedules for the vehicle systems 102 that are based (at least in part) on capacities of the vehicle yards 200 (shown in FIG. 2) to receive incoming vehicle systems 102. The scheduling module 330 may delay a scheduled arrival time for a vehicle system 102 to arrive at a vehicle yard 200 if doing so does not have a significant negative impact on the flow of traffic in the transportation network 100. For example, the scheduling module 330 may delay an arrival time of a vehicle system 102 such that delaying the arrival time does not decrease a throughput parameter of the transportation network 100 below a predetermined threshold.

The throughput parameter may represent the flow, rate, or movement of the vehicle systems 102 traveling through the transportation network 100 or a subset of the transportation network 100 (e.g., the vehicle yard 200, segment of the route 106). In an embodiment, the throughput parameter may indicate how successful the vehicle systems 102 are in arriving at the destination location or intermediate location according with respect to the schedule or movement plan associated with each vehicle system 102. For example, the throughput parameter may be a statistical measure of adherence of the vehicle systems 102 to the schedules of the vehicle systems 102 within the movement plan. The term "statistical measure of adherence" may refer to a quantity that is calculated for a vehicle system 102 indicating how closely the vehicle system 102 is following the schedule associated with the vehicle system 102. Further, several statistical measures of adherence to the movement plan may be calculated for more than one or various vehicle systems 102 traveling within the transportation network 100.

The monitoring module 332 may determine the throughput parameters for the transportation network 100, or an area thereof, based on the statistical measures of adherence associated with the vehicle systems 102. For example, a throughput parameter may be an average, median, or other statistical calculation of the statistical measures of adherence for the vehicle systems 102 concurrently traveling in the transportation network 100. The throughput parameter may be calculated based on the statistical measures of adherence for all, substantially all, a supermajority, or a majority of the vehicle systems 102 traveling in the transportation network 100.

The scheduling system 154 may include a monitoring module 332 which monitors travel of the vehicle systems 102 within the transportation network 100 (shown in FIG. 1) and/or capacities of the vehicle yards 200 over time. The vehicle systems 102 may periodically report current positions of the vehicle system 102 to the scheduling system 154 (and/or other information such as route and speed) so that the monitoring module 332 may track where the vehicle systems 102 are located over time. Alternatively, signals or other sensors disposed alongside the routes 106 and 116 of the transportation network 100 may periodically report the passing of vehicle system 102 by the signals or sensors to the scheduling system 152. Optionally, the monitoring module 332 may track the capacities of the vehicle yards 200 (shown in FIG. 2) by monitoring how many vehicle systems 102 enter and how many vehicle systems 102 leave each of the vehicle yards 200. Additionally or alternatively, the monitoring system 322 may receive vehicle connection plan status updates from the yard planner system 152 relating to the position or estimate of when the vehicle system 102 may leave the vehicle yard 200.

The monitoring module 332 may determine the throughput parameters of the transportation network 100 (shown in FIG. 1) and/or areas of the transportation network 100 that are used by the scheduling module 330. The monitoring module 332 may calculate the throughput parameters based on the schedules of the vehicle systems 102 and deviations from the schedules by the vehicle systems 102. For example, in order to determine a statistical measure of adherence to the schedule associated with the vehicle system 102, the monitoring module 332 may monitor how closely the vehicle system 102 adheres to the schedule (e.g., arrival times of the vehicle system 102 at a destination or intermediate location compared to the scheduled arrival time) as the vehicle system 102 travels within the transportation network 100.

The vehicle system 102 may adhere to the schedule of the vehicle system 102 by proceeding along a path on the route 106 toward the scheduled destination or intermediate location such that the vehicle system 102 will arrive at the scheduled location at the scheduled arrival time or within a predetermined time buffer of the scheduled arrival time. For example, an estimated time of arrival (ETA) of the vehicle system 102 may be calculated as the time that the vehicle system 102 will arrive at the scheduled destination or intermediate location if no additional anomalies (e.g., mechanical failures, route damage, route traffic, waiting for vehicle connection plan at the vehicle yard 200, or the like) occur that changes the speed or departure from an intermediate location (e.g., vehicle yard 200) at which the vehicle system 102 travels. If the ETA is the same as or within a predetermined time buffer the scheduled arrival time, then the monitoring module 332 may calculate a large statistical measure of adherence for the vehicle system 102. As the ETA differs from the scheduled arrival time (e.g., by occurring after the scheduled arrival time), the statistical measure of adherence may decrease.

Additionally or alternatively, the vehicle system 102 may adhere to the schedule by arriving at or passing through scheduled waypoints of the schedule at scheduled times that are associated with the waypoints, or within the predetermined time buffer of the scheduled times. As differences between actual times that the vehicle system 102 arrives at or passes through the scheduled waypoints and the associated scheduled times of the waypoints increases, the statistical measure of adherence for the vehicle system 102 may decrease. Conversely, as these differences decrease, the statistical measure of adherence may increase.

The monitoring module 332 may calculate the statistical measure of adherence as a time difference between the ETA of the vehicle system 102 and the scheduled arrival time of the schedule associated with the vehicle system 102. Alternatively, the statistical measure of adherence for the vehicle system 102 may be a fraction or percentage of the scheduled arrival time. For example, the statistical measure of adherence may be the difference between the ETA and the scheduled arrival time over the scheduled arrival time. Optionally, the statistical measure of adherence may further include the ETA of the vehicle system 102 to a number of scheduled waypoints (e.g., between the origin location and/or intermediate locations and the destination location) along the path of the movement plan for the vehicle system 102 and the scheduled arrival time. Alternatively, the statistical measure of adherence may be a sum total, average, median, or other calculation of time differences between the actual times that the vehicle system 102 arrives at or passes by scheduled waypoints and the associated scheduled times.

The differences between when the vehicle system 102 arrives at or passes through one or more scheduled locations and the time that the vehicle system 102 was scheduled to arrive at or pass through the scheduled locations may be used to calculate the statistical measure of adherence to a schedule for the vehicle system 102. In an embodiment, the statistical measure of adherence for the vehicle system 102 may represent the number or percentage of scheduled locations that the vehicle system 102 arrived too early or too late. For example, the monitoring module 332 may count the number of scheduled locations that the vehicle system 102 arrives at or passes through outside of a time buffer around the scheduled time. The time buffer can be one to several minutes. By way of example only, if the time buffer is three minutes, then the monitoring module 332 may examine the differences between the scheduled times and the actual times and count the number of scheduled locations that the vehicle system 102 arrived more than three minutes early or more than three minutes late. Alternatively, the monitoring module 332 may count the number of scheduled locations that the vehicle system 102 arrived early or late without regard to a time buffer.

The monitoring module 332 may calculate the statistical measure of adherence by the vehicle system 102 to the schedule based on the number or percentage of scheduled locations that the vehicle system 102 arrived on time (or within the time buffer). For example, the monitoring module 332 may calculate that the vehicle system 102 adhered to the schedule (e.g., remained on schedule) for 71% of the scheduled locations and that the vehicle system 102 did not adhere (e.g., fell behind or ahead of the schedule) for 29% of the scheduled locations. Additionally or alternatively, the monitoring module 332 may calculate the statistical measure of adherence by the vehicle system 102 to the schedule based on the total or sum of time differences between the scheduled times associated with the scheduled locations and the actual times that the vehicle system 102 arrived at or passed through the scheduled locations.

In an embodiment, the monitoring module 332 may calculate the average statistical measure of adherence by comparing the deviation of each vehicle system 102 from the average or median statistical measure of adherence of the several vehicle systems 102 traveling within the transportation network 100. For example, the monitoring module 332 may calculate an average or median deviation of the measure of adherence for the vehicle systems 102 from the average or median statistical measure of adherence of the vehicle systems 102.

Additionally, the scheduling system 154 may assign the priority to the vehicle system 102 and/or the vehicles within the vehicle system 102 (e.g., the CCV 104, the PGV 108) which may be used by the yard planner system 152 (as described above). The priority may be based on the throughput parameter or statistical measure of adherence determined by the monitoring module 332, a business objective of the transportation network 100 (e.g., delivery deadline of a payload of the CCV 104, reliance on the vehicle system 102 and/or PGV 108 by a plurality of other vehicle systems 102), by the operator of the vehicle yard 200, the central dispatch or other office that generates the trip plans for one or more vehicle systems 102, or the like.

Figure 4:
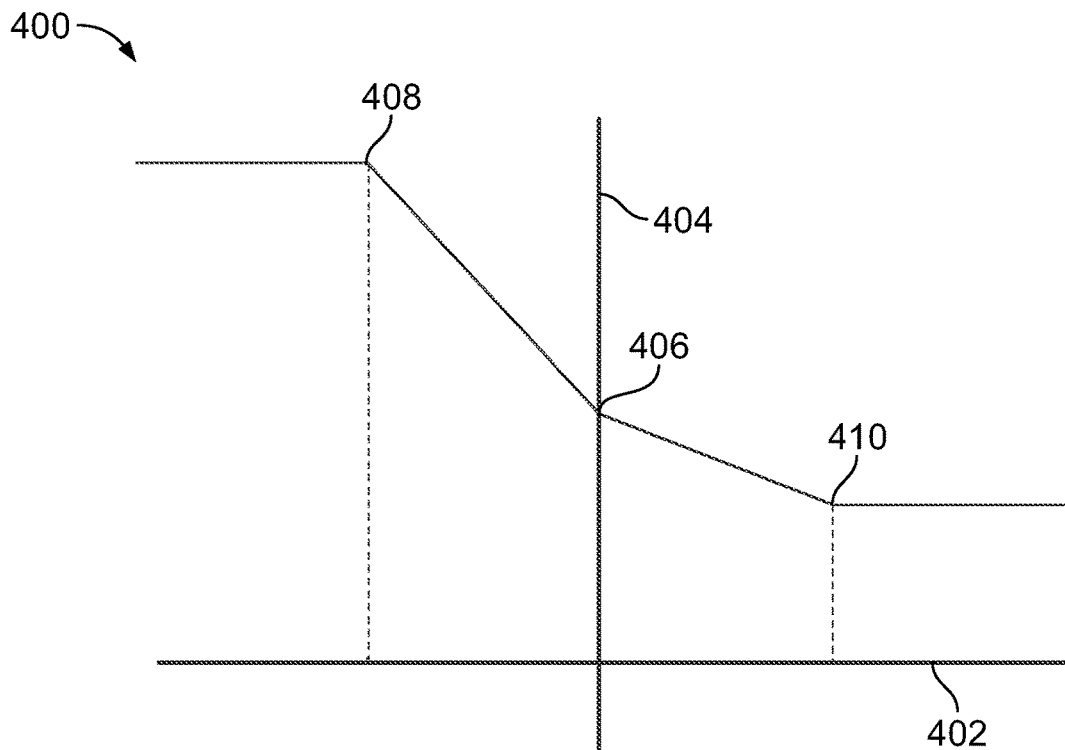
FIG. 4 is an illustration of a priority curve used by an embodiment of a scheduling/control system.
Figure 5:
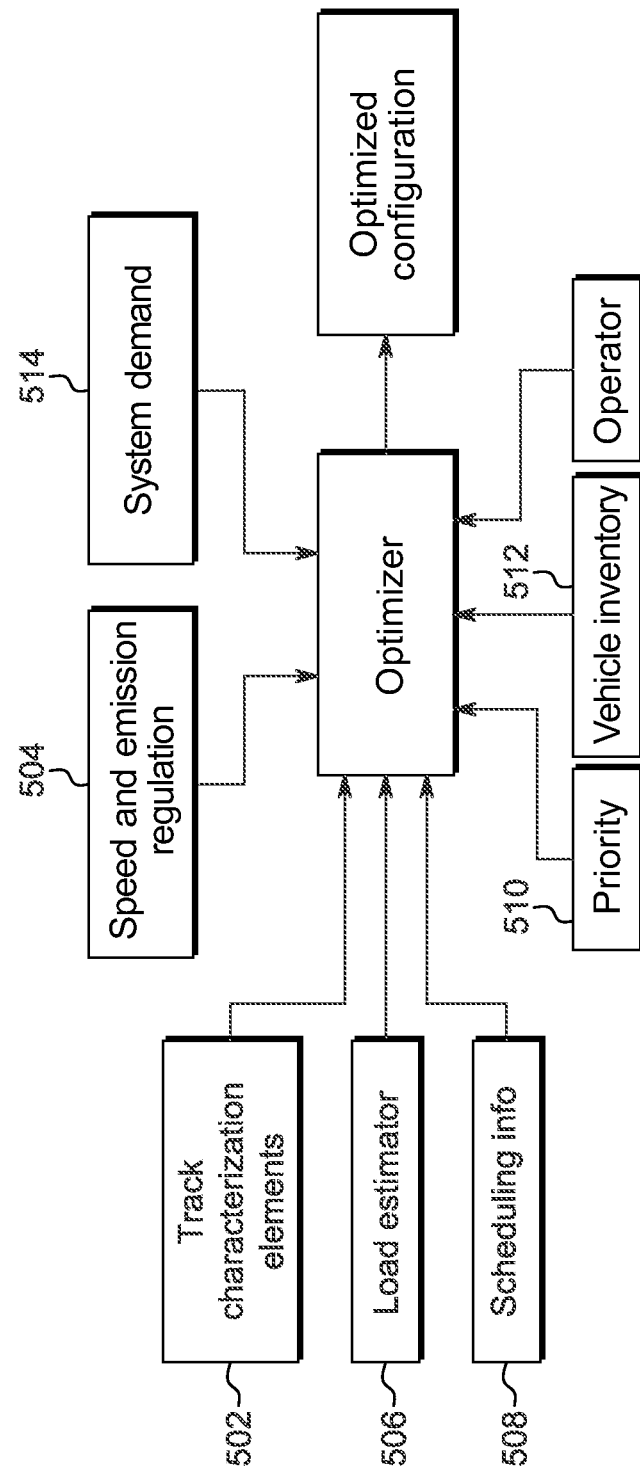
FIG. 5 is an illustration of information used by an optimizer of an energy management system in accordance with an embodiment.

FIG. 4 illustrates a priority curve 400 that may be used by the scheduling system 154. The priority curve 400 may be predetermined and stored on memory 334, received by the scheduling system 154 from an input by the operator using the user interface 306, or the like. The x-axis 402 may represent the statistical measure of adherence. For example, a position traversing left along the x-axis 402 exemplifies a decreasing statistical measure of adherence (e.g., ETA of the vehicle system 102 is greater than or later in time than the scheduled time of arrival), and conversely the position traversing right along the x-axis 402 exemplifies an increasing statistical measure of adherence (e.g., ETA of the vehicle system 102 is lesser than or earlier in time than the scheduled time of arrival). The y-axis 404 represents the priority, such that, a position traversing upwards and away from the x-axis 402 exemplifies an increasing priority and conversely the position traversing towards the x-axis exemplifies a decreasing priority. For example, the monitoring module 332 is tracking three vehicles systems 102A, 102B and 102C entering the vehicle yard 200 (FIG. 2) each having a movement plan. The monitoring module 332 determines a statistical measure of adherence for each vehicle system with respect to the priority curve 400, such that, 406 represents the vehicle system 102A, 408 represents the vehicle system 102B, and 410 represents the vehicle system 102C. Further, using the priority curve 400 the monitoring module 332 may determine a priority (e.g., value of the y-axis) associated for each vehicle system 102A, 102B, 102C and may output the said priorities to the yard planner system 152, using the communication system 302. The priority may be represented as a number for each vehicle system 102, a list of the vehicle systems 102 within the transportation network 100 and/or in the vehicle yard 200 in a priority order, a color scheme, or the like. The yard planner system 152 may determine or adjust the yard plan based on the priority of the incoming vehicle systems 102A, 102B, and 102C and/or vehicle systems 102 currently within the vehicle yard 200. For example, the yard planner system 152 may complete the vehicle connection plan of the vehicle system 102B, represented as 408 on the priority curve 400, before the vehicle connection plans of the vehicle systems 102A and 102C, respectively, due to the higher priority of the vehicle system 102B.

The energy management system 156 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as a memory 344. The memory 344 may include one or more computer hard drives, flash drives, RAM, ROM, EEPROM, or the like. Alternatively, one or more of the sets of instructions that direct operations of the hardware may be hard-wired into the logic of the hardware.

The energy management system 156 determines an optimized vehicle system configuration for the movement plan which may be used by the yard planner system 152 to determine a vehicle connection plan to create the yard plan and/or to adjust an existing yard plan. As used herein, the term "optimize" (and forms thereof) are not intended to require maximizing or minimizing a characteristic, parameter, or other object in all embodiments described herein. Instead, "optimize" and its forms are intended to mean that a characteristic, parameter, or other object is increased or decreased toward a designated or desired amount. For example, an "optimized" vehicle system configuration for fuel efficiency is not limited to a complete absence of fuel consumption or that the absolute minimum amount of fuel is consumed by the vehicle system. Rather, the optimized vehicle system configuration for fuel efficiency may mean that the fuel efficiency is increased, but not necessarily maximized, relative to other possible vehicle system configurations available. However, the "optimized" vehicle system configuration for fuel efficiency can include reducing fuel consumption to the minimum amount possible. As another example, optimized vehicle system configuration for emission generation may not mean completely eliminating the generation of all emissions from the vehicle system. Instead, optimized vehicle system configuration for emission generation may mean that the amount of emissions generated by the vehicle system is reduced but not necessarily eliminated relative to other possible vehicle system configurations available. However, optimized vehicle system configuration for emission generation can include reducing the amount of emissions generated to a minimum amount possible. In an embodiment, the "optimized" vehicle system configuration for a characteristic (e.g., fuel efficiency, generated emissions, weight distribution), parameter (e.g., tractive effort), or other object includes increasing or decreasing the characteristic, parameter, or object (as appropriate) during performance of a mission (e.g., a trip) such that the characteristic, parameters, or object is increased or decreased (as appropriate) relative to performing the same mission in another vehicle system configuration.

For example, the energy management system 156 determined that the PGV 108A selected for the vehicle system 102A traveling along a trip according to an optimized vehicle system configuration and trip plan and may result in the vehicle system 102A consuming less fuel and/or generating fewer emissions relative to traveling along the same trip having another vehicle configuration, such as having PGV 108B rather than PGV 108A for the vehicle system 102A.

The optimized vehicle configuration, for example, may be determined by an optimizer module 340 analyzing or calculating different timing and load demands of the vehicle system 102 and the transportation network 100 using different input information. The optimizer module 340 may analyze the movement plan of the vehicle system 102, specifically, the scheduling information 508 (e.g., timing requirements of the vehicle system 102 to arrive at the destination or intermediate location), speed and emission regulations 504 (e.g., predetermined and based on the route 106 location), track characterization elements 502, the vehicle inventory 512, and the load estimator 506 to determine a minimum tractive effort threshold required to be produced by the one or more PGV 108 selected for the optimized vehicle configuration for the vehicle system 102. The optimizer module 340 further selects the one or more PGV 108 based on a sum of the tractive effort produced from each of the PGV 108 of the vehicle inventory 512 is at least or greater than the minimum tractive effort threshold of the vehicle system 102 to arrive within a predetermined time period (e.g., scheduling information 508), and an optimization requirement (e.g., fuel consumption, emission generation) received from the operator, the dispatch facility, or the like. Optionally, the optimizer module 340 may additionally base the selection and/or optimized vehicle configuration of the vehicle system 102 on the weight distribution of the vehicle system 102.

The tractive effort is representative of the tractive effort the one or more PGV 108 units are capable of and/or need to provide to propel the vehicle system 102 along the route 106 and 116. The tractive effort may be a measure of pounds force or traction amps (for electric motors). The tractive effort may vary along the movement plan due to changes in parameters, for example, changes in a curvature and/or grade of the route 106, speed limits and/or requirements of the vehicle system 102, or the like. As these parameters change during the movement plan, the total tractive effort, or force, that is required to propel the vehicle system 102 along the track 106 may also change.

The track characterization elements 502 may provide information, for example terrain characteristics, about the remaining segments or portions of the route 106 to be traveled by the vehicle system 102 from the vehicle yard 200 to the destination location and/or remaining intermediate locations before the destination location (e.g., other vehicle yards 200) while following the movement plan. The track characterization elements 402 may be used by the optimizer module 340 to account for additional or reduced tractive effort needed by the one or more PGV 108 until the destination or intermediate location. For example, the vehicle system 102 following the movement plan along the route 106 that has a negative average track grade from the vehicle yard 200 to the destination or intermediate locations. The negative average track grade of the movement plan may require a lower minimum tractive effort threshold of the vehicle system 102 than a positive or zero average track grade, respectively. The track characterization elements 402 may include grade, elevation, curvature information, or the like of the remaining segments of the route 106.

The vehicle inventory may be received by the optimizer module 340 from the yard planner system 152 using the communication system 302 and/or stored on the memory 344. The vehicle inventory 512 may include a database of all available PGV 108 within the vehicle yard 200. The availability of the PGV 108 may be based on the vehicle connection plans of the yard plan (e.g., the available PGV 108 are not included in any vehicle connection plans), the maintenance cycles of the PGV 108, user input by the operator (e.g., through the user interface 306), or the like.

Additionally or alternative, the yard plan may isolate or store the one or more available PGV 108 into a larger group of PGV 120 within the vehicle yard 200. The database may include characteristics of the available PGV 108 such as the weight, propulsion capabilities or tractive effort, fuel efficiency with respect to various speed or tractive efforts, range capabilities on a single fueling, or the like. The vehicle inventory 512 may also include or identify the CCV 104 that are to be included into the optimized vehicle system configuration from the movement plan and/or yard plan (e.g., vehicle connection plans). Optionally, the vehicle inventory 512 may include PGV 108 and/or CCV 104 that are included in vehicle systems 102 that are inbound (e.g., next stop is the vehicle yard 200) within a set distance of the vehicle yard 200 or scheduled to arrive into the vehicle yard 200 within a predetermined future time period (e.g., within thirty minutes of the scheduled departure time of the vehicle system being optimized).

The load estimator 560 calculates a load of the vehicle system 102 based on information contained in the vehicle inventory or yard plan (e.g., the CCV 104 to be included in the vehicle system 102), historical data, a rule of thumb estimation, and/or table data.

In an embodiment, the optimizer module 340 may receive the priority of the vehicle system 102 and/or the CCV 104 from the scheduling system 154 through the communication system 302, vehicle yard operator, dispatch facility, or the like and adjust the minimum tractive effort threshold. For example only, the optimizer module 340 has determined the minimum tractive effort threshold for the vehicle system 102B, not accounting for the priority of the vehicle system 102B, is 40,000 Newtons (N). The vehicle inventory 512 includes the PGV 108B (currently coupled to the vehicle system 102B) and the larger group PGV 120 having the PGV 108A and PGV 108C. The tractive effort of the PGV 108B is 30,000 N which is below the minimum tractive effort threshold for the vehicle system 102B when leaving the vehicle yard 200. The tractive effort of the PGV 108A is 44,000 N and the tractive effort of the PGV 108C is 51,000 N which are both greater than the minimum tractive effort threshold. However, regarding fuel consumption and/or generation of emissions traveling along the movement plan, the PGV 108A is determined by the optimizer module 340 to consume less fuel and/or generates less emissions, respectively, than the PGV 108B. Due to the lower fuel consumption and/or less emissions the optimizer module 340 selects the PGV 108A, and outputs the PGV selection to the yard planner system 152 as the vehicle connection plan for vehicle system 102B.

Conversely, continuing with the above example, the inclusion of the priority of the vehicle system 102B may affect the selection of the one or more PGV 108 by the optimizer module 340. The vehicle system 102B may be represented at 408 on the priority curve 400 (FIG. 4) illustrating a high priority. The high priority of the vehicle system 102B may require the vehicle system 102B to demand more power or tractive effort of the one or more PGV 108 (e.g., quick acceleration, higher speed) beyond the preset requirements described above (e.g., track characterization elements, load estimator). Accordingly, the optimizer module 340 may determine that the minimum tractive effort threshold of the vehicle system 102B should be increased to 50,000 N. Due to the high priority of the vehicle system 102B, the optimizer module 340 selects the PGV 108C having a tractive effort of 50,000 N even though the PGV 108A has a higher fuel efficiency, respectively.

In an embodiment, the optimizer module 340 may adjust the selection of the one or more PGV 108 based on the availability of vehicles at the destination or intermediate locations based on a system demand database 514. The system demand database 514 may log requests or status alerts from remote vehicle yards, operators, dispatch facilities, the schedule system 154, or the like of a shortage or need for one or more PGV 108 having certain characteristics (e.g., tractive effort, speed, generated emissions, fuel efficiency). The requests on the system demand database 514 may be automated by the scheduling system 154 to maintain an equal distribution of one or more PGV 108 having a higher tractive effort, set fuel efficiency, emissions, or the like. Optionally, the requests may represent a future or current need by the remote vehicle yard 200 for a PGV 108 having a tractive effort for an awaiting vehicle system 200 within the remote vehicle yard 200.

For example only, the optimizer module 340 has determined the minimum tractive effort threshold for the vehicle system 102A is 35,000 N. The vehicle inventory 512 includes the PGV 108B coupled to an incoming vehicle system (the vehicle system 102B) and the larger group PGV 120 having the PGV 108A and PGV 108C. The tractive efforts are of the PGV 108B is 30,000 N, of the PGV 108A is 44,000 N, and of the PGV 108C is 51,000 N. The optimizer module 340 may compare the movement plan of the vehicle system 102A with the system demand database 514 and determine that one of the intermediate locations (e.g., vehicle yards 200) has a request listed within the system demand database 514 for a PGV 108 having a tractive effort of over 40,000 N. The optimizer module 340 may reset or adjust the minimum tractive effort threshold to match the requested tractive effort of the remote vehicle yard 200 of 40,000 N resulting in the selection of PGV 108A and/or PGV 108C.

Figure 6:
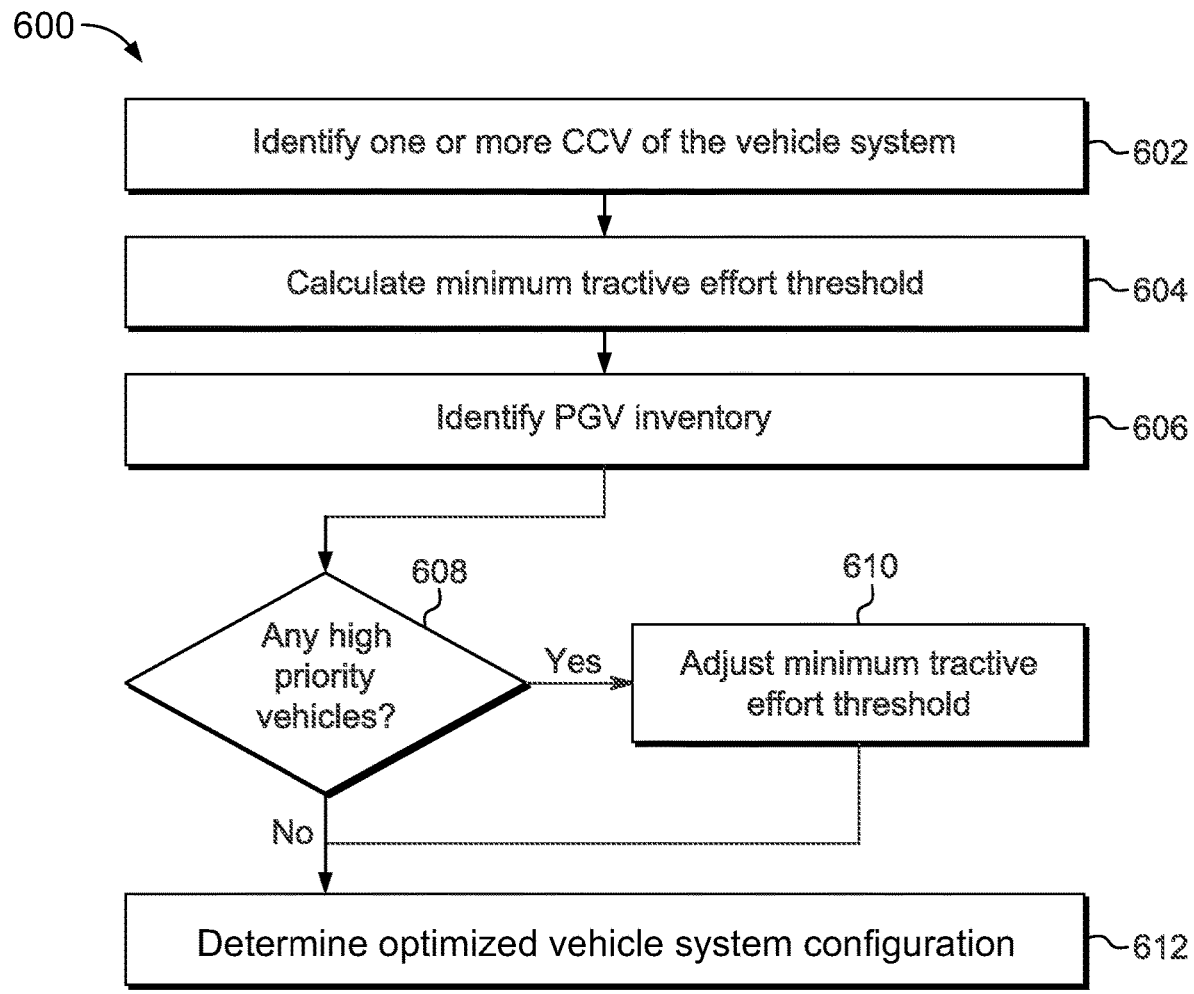
FIG. 6 is a flowchart of an embodiment of a method for a control system of a vehicle yard within a transportation network.

FIG. 6 is a flowchart of a method 600 for a control system 150 for the vehicle yard 200 within a transportation network 100. The method 600 for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be able to be used as one or more algorithms to direct hardware to perform one or more operations described herein. Additionally or alternatively, the method 600 may represent a workflow for the operator of a vehicle yard 200.

At 602, identify the one or more CCV 104 for the vehicle system 102. For example, the one or more CCV 104 may be identified by the scheduling system 154 based on the predetermined departure time of the CCV 104, the destination location or intermediate location of the CCV 104, the type of payload within the CCV 104, selection by the operator of the vehicle yard 100, priority of the CCV 104, communication by a remote vehicle yard, or the like. Additionally or alternatively, the yard planner system 152 may identify the one or more CCV 104 using the monitoring system 322 and group the CCV 104 into a CCV group 110 to await coupling with the matched outgoing vehicle system and/or one or more PGV 108 to form the matched outgoing vehicle system.

At 604, calculate the minimum tractive effort threshold. As described above, the energy management system 156 may determine the minimum tractive effort threshold by analyzing the movement plan of the vehicle system 102, specifically, the scheduling information 508 (e.g., timing requirements of the vehicle system 102 to arrive at the destination or intermediate location), speed and emission regulations 504 (e.g., predetermined and based on the route 106 location), track characterization elements 502, the vehicle inventory 512, and the load estimator 506 to determine a minimum tractive effort threshold required to be produce by the one or more PGV 108 selected for the optimized vehicle configuration for the vehicle system 102.

At 606, identify the PGV inventory. As described above, the PGV inventory may be included within the vehicle inventory database 512 received by the optimizer module 340. The PGV inventory may include all available PGV 108 within the vehicle yard 200 based on the vehicle connection plans of the yard plan (e.g., the available PGV 108 are not included in any vehicle connection plans), the maintenance cycles of the PGV 108, user input by the operator (e.g., through the user interface 306), or the like. Additionally, the optimizer module 340 may include PGV 108 within the vehicle inventory database 512 that are included in vehicle systems 102 that are inbound within a set distance of the vehicle yard 200 or scheduled to arrive into the vehicle yard 200 within a predetermined future time period (e.g., within thirty minutes of the scheduled departure time of the vehicle system being optimized).

At 608, determine whether there are any high priority vehicles. If there are high priority vehicles, at 610, adjust the minimum tractive effort threshold. As described above, the priority of the vehicles (e.g., vehicle system 102, CCV 104, PGV 108) may be determined using the priority curve 400 (FIG. 4) by the scheduling system 154, the operator, or the like. Based on the priority of the vehicle, as described above, the optimizer module 340 may adjust the minimum tractive effort threshold, for example, the optimizer module 340 may increase the minimum tractive effort threshold of a high priority vehicle system 102 relative to a low priority vehicle system 102 due to the priority of the vehicle system 102.

At 612, determine an optimized vehicle system configuration. As described above, the optimizer module 340 within the energy management system 156 determines the optimized vehicle configuration by isolating the one or more PGV 108 within the larger group of PGV available within the vehicle inventory database 512 having a tractive effort greater than the minimum tractive effort threshold. Additionally, depending on what is being optimized (e.g., fuel efficiency, emission generation), the optimizer module 340 determines which set of the one or more PGV 108 to be included within the vehicle system 102 having the highest fuel efficiency and/or lowest emission generation relative to the larger group of PGV available within the vehicle inventory database 512.

Optionally, the method 600 may further include automatically generating one or more signals to be communicated to an operator in the vehicle yard 200 to direct coupling of the set of one or more PGV 108 with the CCV 104 to form the vehicle system 102.

Optionally, the method 600 may further include determining a priority of the vehicle system 102 within a rail network 100. The priority of the vehicle system 102 adjusts the minimum tractive effort threshold.

Optionally, the method 600 may additionally base the minimum tractive effort threshold on a terrain of the route 106.

Optionally, the method 600 may further have the selection of the set of one or more PGV 108 further based on a planned position of the set of one or more PGV 108 within the vehicle system 102. Alternatively, the selection of the set of one or more PGV 108 is further based on a weight distribution of the vehicle system. Alternatively, the selection of the set of one or more PGV 108 is further based on a number of available PGV 108 from a remote vehicle yard along the route 106 or a communication from the remote vehicle yard along the route 106.

Optionally, the method 600 may further have the larger group of PGV include PGV 108 entering the vehicle yard 200 within a predetermined future time period. Additionally, the method 600 may further include determining a priority of the CCV 104, such that the priority of the CCV adjusts which PGV 108 are available within the larger group of PGV.

In an embodiment, the memories 324, 334, and/or 344 may contain maintenance data of each PGV 108 within the transportation network 100 and/or vehicle yard 200. The maintenance data may include a maintenance or repair history of the PGV 108 (may include type and date of work completed on the PGV 108), life span or life expectancy of parts installed in the PGV 108 (e.g., bearings, axles, rotors, wheels, lights, air brake valve, or the like), general maintenance schedule of the PGV 108 based on a predetermined distance traveled or a predetermined time of a previous maintenance service (e.g., flushing of fluids, check lubrication), or the like. The maintenance data may be used to determine whether a maintenance cycle of the PGV 108 may be scheduled and included in the yard plan (e.g., vehicle connection plan) to complete a maintenance task (e.g., flushing of fluids, replacing a bearing, or the like) within the vehicle yard 200. For example only, the PGV 108B of the vehicle system 102B enters the vehicle yard 200. The yard planning system 152 may access the general maintenance schedule relating to the PGV 108B stored on the memory 324 determining (e.g., based on a length of time from the last maintenance cycle, based on a distance traveled from the last maintenance cycle) that the maintenance cycle for the PGV 108B may be scheduled and included in the yard plan. Accordingly, the yard planning system 152 may include a vehicle connection plan to partition the PGV 108B from the vehicle system 102B to fulfill the maintenance cycle of the PGV 108B within the vehicle yard 200.

Optionally, the method 600 may have the selection of the set of the one or more PGV 108 further based on the maintenance cycles of the one or more PGV 108. In an embodiment, select vehicle yards 200 within the transportation network 100 may perform maintenance tasks (e.g., replacing bearings within the electric motor) faster than or may have a needed replacement part (e.g., axle) for the maintenance cycle of the PGV 108 relative to other vehicle yards 200 within the transportation network 100. The maintenance task performance (e.g., duration of time to complete the maintenance task) and/or a replacement part inventory of the vehicle yards 200 may be stored within a maintenance database in the memory 344. Additionally, the optimizer module 340 may determine the vehicle configuration of the vehicle system 102 based on the maintenance cycle of the PGV 108.

For example only, a vehicle system 102B that includes the PGV 108B enters the vehicle yard 200A. The PGV 108B, based on the maintenance data, may be determined to need or is due for a maintenance cycle. The maintenance cycle for the PGV 108B may be added to the scheduling information 508. The optimizer module 340, analyzing the scheduling information 508, may determine an idle time based on the maintenance database (e.g., maintenance task performance, replacement inventory) for the vehicle yard 200A and other vehicle yards 200 (e.g., the vehicle yard 200B) within the transportation network 100. The idle time may represent the amount or duration of time the PGV 108B may be unavailable (e.g., not included within the vehicle inventory 512) due to the completion of the maintenance cycle. It should be noted, the idle time may also include an amount of time for the vehicle yard 200 to order or receive a needed replacement part for the maintenance cycle into the replacement part inventory. The optimizer module 340 may compare the idle times for the maintenance cycles performed at various vehicle yards 200, respectively, against a predetermined idle threshold. Once the idle times are determined, the optimizer module 340 may determine the selection of the set of one or more PGV 108 for the various vehicle systems 102 in order to minimize the PGV 108 idle times within the transportation network 100. For example, the optimizer module 340 may determine that the idle time, based on the maintenance cycle, for the vehicle yard 200A may be greater than the predetermined idle threshold. Further, the optimizer module 340 may determine that the idle time, based on the maintenance cycle, within the vehicle yard 200B may be below the predetermined idle threshold. Based on the idle times of the vehicle yards 200, the optimizer module 340 may adjust the selection of the set of one or more PGV 108 based on the destination or intermediate location of the vehicle system 102. For example, the optimizer module 340 may include and/or flag (e.g., prioritize over alternative PGV 108 meeting optimization requirements) the PGV 108B within the vehicle inventory 512 for vehicle systems 102 that have the vehicle yard 200B as a destination or intermediate location within the scheduling information 508.

Conversely, continuing with the example above, the optimizer module 340 may determine that the PGV 108B has an idle time below the predetermined idle threshold for the vehicle yard 200A. Since the idle time is below the predetermined threshold, the optimizer module 340 may instruct the yard planner system 152 to remove the PGV 108B from the available vehicle inventory 512 and include a vehicle connection plan in the yard plan to partition or decouple the PGV 108B from the vehicle system 102B for the maintenance cycle.

In an embodiment, the control system 150 includes the yard planner system 152 having one or more processors. The yard planner system 152 may be configured to create the yard plan for the vehicle yard 200 that includes a vehicle connection plans for coupling a selection of one or more propulsion generating vehicles (PGV) 108 with a selection of one or more cargo-carrying vehicles (CCV) 104 to form a first vehicle system. The yard plan is further created based on the movement plan and an optimized vehicle system configuration of the first vehicle system. The control system 150 also includes the schedule system 154 having one or more processors. The schedule system 154 is configured to create the movement plan of the first vehicle system. The movement plan includes a destination location and predetermined arrival time of the first vehicle system along a route. The control system 150 further includes the energy management system 156 having one or more processors. The energy management system is configured to determine the optimized vehicle system configuration. The optimized vehicle system configuration includes the selection of the one or more PGV 108 from a vehicle inventory having a larger group of PGV (e.g., the larger PGV group 120), based on the movement plan of the first vehicle system and a tractive effort of the selection of the one or more PGV 108.

Optionally, the selection of the one or more PGV 108, by the control system 150, may be further based on fuel consumption and/or emission generation such that the selected one or more PGV 108 have a lower fuel consumption and/or generate less emission than the remaining PGV (e.g., the larger PGV group 120) in the vehicle inventory. It should be noted that the selected one or more PGV 108 has a lower fuel consumption and/or generates less emission with respect to having or respectively to the fuel consumption and/or emissions generated if the one or more of the remaining PGV forming and propelling the vehicle system 102 to the subsequent intermediate location or final destination along the same movement plan.

Optionally, the selection of the one or more PGV 108, by the control system 150, may be further based on the weight distribution of the first vehicle system.

Optionally, the energy management system 156 may be configured to determine the minimum tractive effort threshold required to propel the first vehicle system along the route at or within the predetermined arrival time, and the tractive effort of the selected one or more PGV is at least or greater than the minimum tractive effort threshold. Additionally, the minimum tractive effort threshold may be further based on the terrain of the route.

Optionally, the vehicle inventory may include PGV entering the vehicle yard 200 within a predetermined future time period.

Optionally, the vehicle inventory may be adjusted based on a number of available PGV from a remote vehicle yard 200 along the route or a communication from the remote vehicle yard.

Optionally, the schedule system 154 of the control system 150 may be further configured to assign a priority of the first vehicle system based on the statistical measure of adherence. The statistical measure of adherence may be determined from a position of the first vehicle system relative to a scheduled position of the first vehicle system determined by the movement plan. Additionally, the yard planner system 152 may be configured to adjust the yard plan based on the priority of the first vehicle system, such that, the vehicle connection plan of the first vehicle system displaces a vehicle connection plan of a second vehicle system having a different priority, relatively. Additionally or alternatively, the vehicle inventory may be adjusted based on the priority of the first vehicle system.

Optionally, the yard planner system 152 may generate one or more signals communicating the yard plan to an operator in the vehicle yard 200 to direct coupling of the selection of the one or more PGV 108 with the selection of the one or more CCV 104 to form the first vehicle system.

The control system 150 shown in FIG. 3 can operate to optimize a shipment schedule to incorporate electric charging of energy storage devices onboard electric vehicles traveling in the transportation network 100. The shipment schedule can dictate when and where the electric vehicles are to travel for the transportation of cargo. The cargo can be human passengers, products, materials, other vehicles, or a combination thereof. In contrast to a shipment schedule that merely dictates a starting location, departure time, one or more arrival locations, one or more corresponding arrival times, and optionally one or more routes to travel upon, a shipment schedule determined by the control system 150 according to the inventive subject matter described herein can incorporate or be created based on the need for charging energy storage devices onboard the electric propulsion vehicles. The control system 150 (e.g., the scheduling system 154) can create the shipping schedule to reduce or minimize a difference between a requested or desired delivery time of cargo being shipped and the actual arrival time of delivery of the cargo (e.g., reduced relative to another, different shipping schedule that is not based on the information described herein). This shipping schedule also can be created to increase or maximize an overall energized state of the transportation network and/or the electric vehicles (e.g., increased relative to another, different shipping schedule that is not based on the information described herein). The shipping schedule can be created to ensure that optimal power and energy coverage is provided to the electric vehicles in the transportation network. This optimal coverage can be provided when the fuel and/or electric energy needs of the vehicles are met.

Figure 7:
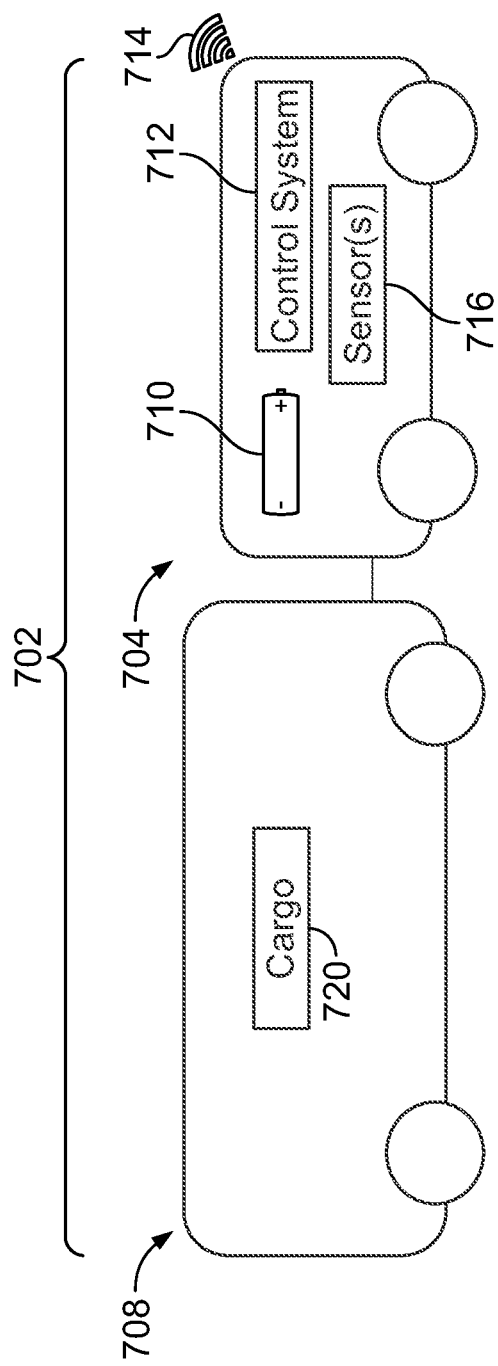
FIG. 7 illustrates one example of a vehicle system.

FIG. 7 illustrates one example of a vehicle system 702. The vehicle system 702 can represent one or more of the vehicle systems 102 shown in FIG. 1. The vehicle system 702 includes an energy tender 704 and a cargo vehicle 708. Alternatively, the vehicle system 702 may include a single or multiple energy tenders 704 and/or a single or multiple cargo vehicles 708. The energy tender 704 optionally can be referred to as a tender vehicle. The energy tender 704 is a vehicle that carries one or more power sources 710, such as one or more onboard energy storage devices. (The energy tender may be a self-propelling vehicle; in another aspect, the energy tender is moved by other vehicles, i.e., not self-propelling.)

These energy storage devices can be distinct from common vehicle batteries. A common battery may be a lead acid vehicle or marine battery that is sized and configured to turn over an engine starter and possibly provide for a limited amount of auxiliary load energy for a short period of time. But, such a common battery is unable to power a traction motor to propel the vehicle 708 or to otherwise continuously provide power to vehicle systems and subsystems. In contrast, an energy storage device can power one or more traction motors for propelling the vehicle 708, and/or to supply an auxiliary load for more than bare functionality or for more than a short while. The energy storage devices can be coupled to a dynamic braking system to charge in response to a dynamic braking event using traction motors. Examples of energy storage devices include a lithium ion cell array, a sodium metal halide cell array, a sodium sulfur cell array, a nickel metal hydride cell array, a nickel cadmium cell array, or an array of ultracapacitors. Optionally, one or more of the power sources 710 can be fuel tanks, such as containers that hold a liquid and/or gaseous fuel that is consumed by an engine that works to propel the vehicle 708. Examples of fuel can include gasoline, diesel fuel, natural gas, compressed air, or the like.

In one embodiment, the vehicle 704 or 708 in the vehicle system 702 can carry cargo or not carry cargo. For example, the vehicle 704 or 708 may hold cargo (products, people, materials for manufacturing products, etc.) for transporting between two or more locations. Optionally, the vehicle 704 or 708 may not hold any cargo, but may instead hold power sources 710 for powering another vehicle. The vehicle 708 in the vehicle system 702 may be capable of self-propulsion in that the vehicle 708 includes one or more devices capable of generating propulsion for moving the vehicle 708. In contrast, the vehicle 704 may not be capable of self-propulsion in that the vehicle 704 does not include any device that is capable of generating such propulsion. The vehicle 704 or 708 in the vehicle system 702 may have power sources 710 onboard the vehicle 704 or 708, or may not include any power sources 710 onboard (but may receive power from power sources 710 onboard another vehicle 704, 708). For example, the vehicle 704 or 708 may include one or more onboard devices capable of providing electric power, such as one or more batteries, combinations of engine and generator (or alternator), etc. Alternatively, the vehicle 704 or 708 may not include any such onboard devices that are capable of providing electric power. In the illustrated example, the vehicle 704 holds the power sources that power the propulsion-generating devices (e.g., motors) onboard the vehicle 708.

The cargo vehicle 708 can include a vehicle control system 712 that controls movement of the cargo vehicle 708. The vehicle control system 712 can represent hardware circuitry that includes and/or is connected with one or more processors (e.g., one or more field programmable gate arrays, one or more microprocessors, one or more integrated circuits, etc.) that control operation of the cargo vehicle 708. The vehicle control system 712 can autonomously control movement of the vehicle 708 (and, optionally, the vehicle 704 while the vehicles 704, 708 are coupled). Alternatively, the vehicle control system 712 can control movement of the vehicle 708 based on input provided by an operator onboard the vehicle 704 and/or the vehicle 708. Optionally, the vehicle control system 712 can control movement of the vehicle 708 autonomously and also based on input provided by an operator onboard the vehicle 704 and/or the vehicle 708 (e.g., by operating in an autonomous control mode during some time periods and operating in a manual control mode during other time periods). As another example, the vehicle control system 712 can control movement of the vehicle 708 based on input provided by an operator off-board the vehicle system 702 or vehicles 704, 708 (e.g., using a remote control device). The vehicle control system 712 optionally includes wireless communication devices that allow for wireless communication 714 with other vehicles 704, 708, with an off-board remote control device, with the control system 150, or the like. These devices can include antennas and associated transceiving hardware. The vehicle 708 can include sensors 716, such as cameras, to assist the control system 712 and/or the operator(s) with controlling movement of the vehicle 708. Although the sensors 716 are shown as being disposed onboard the vehicle 708, one or more sensors 716 can be disposed onboard the vehicle 704.

The vehicle 708 can carry cargo 720 along trips, as described herein. Optionally, the energy tender 704 can carry at least some of the cargo 720. In one embodiment, the energy tender 704 does not carry any of the cargo 720, e.g., the energy tender is not configured to carry cargo and is incapable of carrying cargo.

The control system 150 (e.g., the scheduling module 330 of the scheduling system 154) shown in FIG. 3 can schedule and/or otherwise control movements of the vehicles 704, 708 to increase the efficiency by which cargo 720 is moved throughout the transportation network 100. This increase in efficiency can be represented by more cargo 720 arriving at scheduled destination locations at or before a scheduled arrival time, decreased travel times for the cargo 720 between locations, reduced amounts of electric energy or fuel being consumed to move the cargo 720, etc. In one embodiment, the control system 150 examines the type, category, or class of cargo 720 (e.g., determines that the cargo 720 is), determines a mass to be moved (e.g., the mass of the vehicle system 702 and/or of the cargo 720 carried by the vehicle system 702), and determines a trip over which the vehicle system 702 (and optionally the cargo 720) travels. The details of the trip that are determined can include the routes over which the vehicle system 702 is to travel, a starting location of the trip, a final destination location, and/or one or more intermediate locations between the starting and destination locations. This information can be obtained from a trip manifest provided or otherwise input to the control system 150. From this information, the control system 150 can calculate or estimate the tractive effort required to complete the trip. This tractive effort can be determined based on prior trips of other vehicle systems, based on physics-based models of the vehicle system, cargo, and routes, or otherwise determined.

The control system 150 can then determine how much energy is available to propel the vehicle system 702. This available energy can be determined based on how much energy is stored in the power sources 710 onboard the vehicle(s) 704 located at the starting location of the trip. Optionally, the available energy can be determined based on how much energy is stored in power sources 710 onboard other vehicles 704 not located at the starting location of the trip. As described herein, these other vehicles 704 can couple with the vehicle system 702 en route between the starting and destination locations of the trip. This other available energy can be determined based on the amount of energy stored in the power sources 710 on vehicles 704 in other locations, the locations of these vehicles 704 (e.g., taking into account how much energy would be dissipated or otherwise consumed by moving these vehicles 704 to a location where these vehicles 704 can join the vehicle system 702). The control system 150 can then generate and send control signals relating to movement of the energy tenders 704 for coupling with some combination of the vehicles 708 that self-propel and that carry cargo 720.

Figure 8:
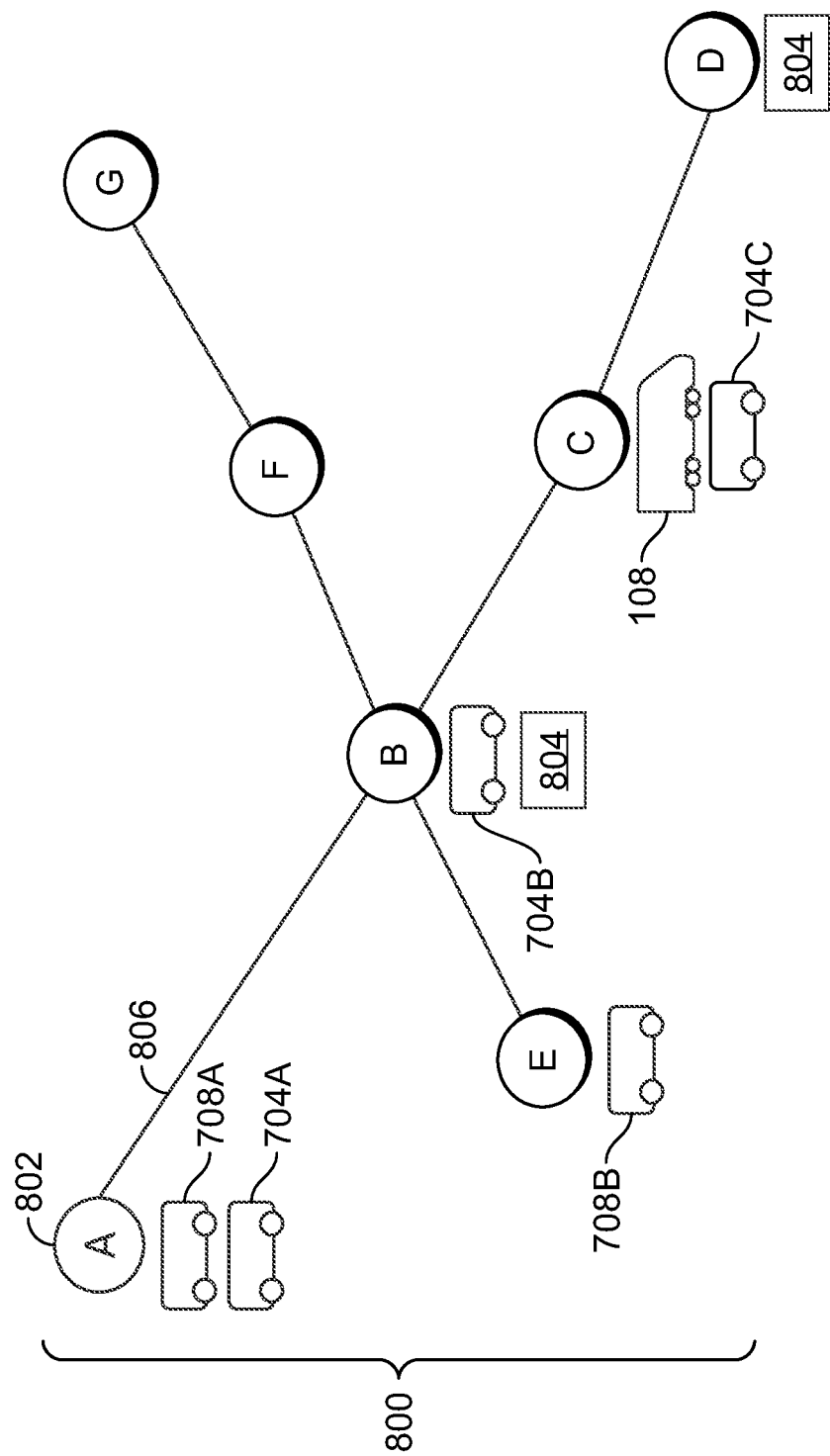
FIG. 8 illustrates one example of a transportation network.

FIG. 8 illustrates one example of a transportation network 800. The transportation network 800 can represent the network 100 shown in FIG. 1, part of the network 100, a larger network that includes the network 100, or a different, separate network. The network 800 is formed by several routes 806 (which can represent the routes 106) that connect or intersect with each other at various locations 802 (e.g., locations A-G in FIG. 8). The locations 802 can represent vehicle yards, rail sidings, intersections, parking lots, garages, or the like. With respect to garages, these can include locations (e.g., buildings) in which vehicles can be housed over a period of time, such as overnight, for several days, etc.

With continued reference to the network 800 shown in FIG. 8, the scheduling module 330 selects one or more energy tenders 704 in the transportation network 800 to couple with the cargo vehicle 708 to move the cargo 720 for the duration of a trip or set of trips to a destination location. The scheduling module 330 can select the energy tenders 704 to include in the various vehicle systems 702 by communicating control signals to the vehicle control systems 712. These control signals can direct the cargo vehicles 708 to move to locations where the energy tenders 704 can couple with cargo vehicles 708 to form vehicle systems 702. Optionally, the control signals can cause the vehicle control systems 712 to present instructions to operators of the cargo vehicles 708 on where to move the energy tenders 704 to join with the cargo vehicles 708 in the vehicle systems 702. Optionally, the energy tenders may be selected based on existing locations of the energy tenders relative to the trip or route (i.e., where the tenders are currently located), and/or the control signals may relate to controlling other vehicles for moving the energy tenders to the locations where the energy tenders can couple with the cargo vehicles to form vehicle systems. In one embodiment, the cargo vehicles 708 that move are powered by one or more other energy tenders 704 and/or are moved by one or more other vehicles.

The scheduling module 330 can communicate with the optimizer module 340 to determine the tractive effort needed to move the cargo 720 along the route(s) 106 between locations 802A-G in the transportation network 800. The scheduling module 330 can determine what energy tenders 704 are available in the transportation network 800, where the available energy tenders 704 are located within the transportation network 800, what other propulsion-generating vehicles are available (and where) in the transportation network 800, and/or a state of charge of the power sources 710 onboard the energy tenders 704. Based on this information, the scheduling module 330 can determine which energy tenders 704 are to power the cargo vehicle 708, whether any propulsion-generating vehicles 108 other than the vehicles 704 are to help move the cargo vehicle 708, which stretches or portions of the routes 806 that the different energy tenders 704 are to power the cargo vehicle 708, and/or which stretches or portions of the routes 806 that the propulsion-generating vehicles 108 are to push or pull the cargo vehicle 708.

For example, the scheduling module 330 can determine that a first energy tender 704A is to connect with and power the axles 722 of a cargo vehicle 708A from a starting location 802A to a first intermediate location 802C between the starting location 802A and a destination location 802D. The scheduling module 330 can determine that a second energy tender 704B at a second location 802B is to couple with the cargo vehicle 708A and the first energy tender 704A to provide additional power to the vehicle system 702 formed from the vehicles 704A, 704B, 708A. This additional power can be used to power the axles 722 of the cargo vehicle 708A and/or to charge power sources 710 of the first energy tender 704A. For example, during movement from the location 802B to the location 802C and/or the location 802D, the power sources 710 onboard the second energy tender 704B can recharge one or more of the power sources 710 onboard the first energy tender 704A while also powering the axles 722 of the cargo vehicle 708A. Optionally, the second energy tender 704B can couple with the cargo vehicle 708A and the first energy tender 704A to receive power from the first energy tender 704A to charge one or more power sources 710 of the second energy tender 704B during movement from the location 802B to the location 802C and/or 802D.

The scheduling module 330 can determine that the first energy tender 704A and/or the second energy tender 704B are to separate from the vehicle system 702 at a third location 802C while a propulsion-generating vehicle 108 (e.g., a locomotive) couples with the cargo vehicle 708A (and optionally the second energy tender 704B) to propel (e.g., push or pull) the cargo vehicle 708A to the destination location 802D. The scheduling module 330 can determine additional changes of the energy tenders 704 and/or vehicles 108 to join the vehicle system 702 to move the cargo 720 toward the destination location at or before the scheduled arrival time. For example, a variety of different combinations of various vehicles 108, 704 can be used to push, pull, or provide power to the cargo vehicle 708 along a trip of the cargo vehicle 708.

The scheduling module 330 can determine which energy tenders 704 (and/or other vehicles 108) are to couple and move with the cargo vehicle 708 at various locations 802 and/or times during a trip of the cargo vehicle 708 based on states of charge of the energy tenders 704. In one embodiment, the state of charge of an energy tender 704 is the amount of electric energy stored in the power sources 710 of the energy tender 704. For example, an energy tender 704 having a full state of charge may have more energy stored onboard the energy tender 704 than when the energy tender 704 has half of a state of charge. The scheduling module 330 can examine the locations of the energy tenders 704 and the current states of charge of the energy tenders 704 to determine which of the energy tenders 704 have enough stored energy to power a cargo vehicle 708 over at least part of a trip. Optionally, the state of charge can be an amount of fuel onboard the energy tender 704. For example, while the description focuses on a state of charge being monitored, alternatively, the amount of fuel remaining onboard an energy tender 704 can be monitored.

In one embodiment, the energy tender 704 can transfer fuel to the cargo vehicle 708. For example, the energy tender 704 and cargo vehicle 708 can couple with each other by fluidly coupling fuel storage tanks onboard each of the energy tender 704 and the cargo vehicle 708 with one or more conduits (e.g., hoses). Fluid fuel (e.g., liquid and/or gaseous fuel) can be transferred from the energy tender 704 to the cargo vehicle 708 to ensure that the cargo vehicle 708 has enough fuel to power the cargo vehicle 708 to an upcoming location, as described herein. Optionally, two or more energy tenders 704 can fluidly couple with each other to transfer fuel between the energy tenders 704.

The scheduling module 330 can strategically change out an energy tender 704 having a significant amount of stored energy from a vehicle system 702 at a mid-way location during a trip. Similar to the example described above, upon arrival of a first vehicle system 702 at an intermediate location 802B of a trip (between a starting location 802A and a destination location 802D of the trip), a first energy tender 704A may have enough remaining stored energy to continue powering a first cargo vehicle 708A in the first vehicle system 702 to a further location 802C in the trip or the destination location 802D of the trip. But, the scheduling module 330 may direct the first energy tender 704A to be decoupled from the first cargo vehicle 708A and removed from the first vehicle system 702 at the intermediate location 802B. Optionally, the scheduling module 330 can direct the first cargo vehicle 708 to couple with a second energy tender 704B in the first vehicle system 702 at this intermediate location 802B and receive power from the second energy tender 704B toward or to the destination location. The first energy tender 704A may then fully or at least partially recharge at the intermediate location 802B before coupling with a second cargo vehicle 708B in a second vehicle system 702.

For example, a charging station 804 may be located at the intermediate location 802B. This charging station 804 can include energy storage devices (e.g., batteries), a connection to an electric utility grid, a connection to another power source (e.g., solar panels, turbine engines, wind turbines, or the like), etc. The power sources 710 onboard the first energy tender 704A can connect with the charging station 804 (e.g., using cables) to charge the power sources 710 of the first energy tender 704A.

This second vehicle system 702 may be moving a second cargo vehicle 708B from another location 802E to the location 802F or 802G through the location 802B. The first energy tender 704A can couple with the second cargo vehicle 708B at the location 802B and move with the second cargo vehicle 708B to power the axles 722 of the second cargo vehicle 708B to the location 802F and/or the location 802G. Optionally, the scheduling module 330 can direct the second cargo vehicle 708B to couple with the first energy tender 704A at the location 802B and proceed as the second vehicle system 702 without recharging the first energy tender 704A or without fully recharging the first energy tender 704A at the location 802B.

The scheduling module 330 can select the energy tenders 704 to provide power to a cargo vehicle 708, select the locations where the energy tenders 704 couple with and/or hand off the cargo vehicle 708, and the like, so that the cargo 720 is delivered to a destination location. For example, the scheduling module 330 can select energy tenders 704 that are not fully charged to couple with a cargo vehicle 708 responsive to the cargo vehicle 708 being ahead of schedule. The scheduling module 330 can direct the cargo vehicle 708A to remain at the location 802B with a partially charged energy tender 704B while the partially charged energy tender 704B fully or at least partially re-charges. The scheduling module 330 can direct the cargo vehicle 708A to remain in this holding pattern even if the additional charge is not needed for the energy tender 704B to power the cargo vehicle 708A over the remainder of the trip from the location 802A to the location 802D via the location 802B. As another example, the scheduling module 330 can direct the cargo vehicle 708A to remain at the location 802B even if the additional charge is not needed for the energy tender 704B to power the cargo vehicle 708A over an upcoming leg of the trip (e.g., the leg extending from the location 802B to the location 802C). This can delay movement of the cargo vehicle 708 along the trip to avoid needlessly adding to the congestion of the transportation network 800, while ensuring that the cargo 720 arrives within the designated time slot.

The scheduling module 330 can direct an energy tender 704 to be moved to another location for charging the energy tender 704. For example, the power sources 710 onboard the energy tender 704C at the location 802C may be depleted of energy or may not have sufficient stored energy to allow the energy tender 704C to power a vehicle 708 to move the energy tender 704C to another location (e.g., the location 802B and/or the location 802D). During a trip of the energy tender 704B from the location 802B to the location 802D through the location 802C (which may involve the energy tender 704B powering a cargo vehicle 708), the scheduling module 330 can direct the energy tender 704B to connect with and power the same or other cargo vehicle 708 to push the energy tender 704C, pull the energy tender 704C, and/or provide electric power to the energy tender 704C so that the energy tender 704C is moved from the location 802C to the location 802D or the location 802B to recharge the power sources 710 of the energy tender 704C. This can be referred to as the energy tender 704C receiving a free ride from the energy tender 704B and at least one cargo vehicle 708 to a location 802 where the power sources 710 of the energy tender 704C can be recharged.

The scheduling module 330 optionally can coordinate the concurrent or simultaneous movement of multiple energy tenders 704 in the transportation network 800 to ensure that the proper amount of energy is provided to the cargo vehicles 708 for powering the cargo vehicles 708 to self-propel to the destination locations of the cargo vehicles 708. This coordination can involve the scheduling module 330 directing one or more energy tenders 704 to couple with a vehicle system 702 on a route 806 between the locations 802. For example, the scheduling module 330 can direct an energy tender 704 to power a cargo vehicle 708 to approach a moving vehicle system 702 from behind (e.g., while the energy tender 704, cargo vehicle 708, and the vehicle system 702 are moving in the same direction on a route 806) and coupling with the vehicle system 702 to join the vehicle system 702 and provide additional energy or fuel to the cargo vehicle(s) 708 in the vehicle system 702. This coupling can occur while the vehicle system 702 is moving along the route 806 or can occur with the vehicle system 702 stopping on the route 806 for the coupling to occur. As another example, the scheduling module 330 can direct an energy tender 704 to power a cargo vehicle 708 and approach a moving vehicle system 702 from ahead (e.g., while the energy tender 704 and the vehicle system 702 are moving in opposite directions on a route 806) and coupling with the vehicle system 702 to join the vehicle system 702 and provide additional energy or fuel to the cargo vehicle(s) 708 in the vehicle system 702.

The scheduling module 330 can communicate with the energy management system 156 to determine energy requirements for moving a cargo vehicle 708 between locations 802 during a trip. The energy requirement can be calculated by the energy management system 156 based on vehicle characteristics (e.g., the weight, mass, height, etc.) of the cargo 720, route characteristics (e.g., the grades and/or curvatures of the route 806), schedule characteristics (e.g., the speeds at which the vehicle systems 702 are to travel to arrive at a location within a scheduled time slot, as described above), or the like. For example, the energy management system 156 can calculate that more energy is needed for heavier cargo 720, taller cargo 720 (e.g., due to wind drag), inclined grades, curved sections of the routes 806, faster speeds, etc. The energy management system 156 can calculate that less energy is needed for lighter cargo 720, shorter cargo 720, flat or downhill grades, straighter sections of the routes 806, slower speeds, etc. The energy management system 156 optionally can determine that more or less tractive effort (and therefore power) is needed depending on weather conditions or other ambient conditions. For example, the presence of ice, snow, or leaves on a route may require more power to propel a cargo vehicle 708 over the route. The scheduling module 330 can then select the energy tenders 704 for including in a vehicle system 702 during different legs (e.g., portions) of a trip with one or more cargo vehicles 708 to ensure that the vehicle system 702 has enough stored energy within the vehicle system 702 over the different legs of the trip. In one embodiment, the scheduling module 330 can determine (e.g., from the energy management system 156) the energy that will be obtained by the energy tenders 704 during movement for charging the power sources 710. For example, the energy management system 156 can inform the scheduling module 330 of energy that will be gained by the energy tenders 704 from dynamic braking. The amounts of energy gained from dynamic braking may be determined from previous trips of the energy tenders 704 and/or vehicle systems 702. The scheduling module 330 can reduce the calculated amount of energy needed over some legs of a trip by the amount of energy that will be gained (e.g., stored in the power sources 710) from this dynamic braking.

The scheduling module 330 can determine the times at which energy tenders 704 are to join or leave vehicle systems 702 having at least one cargo vehicle 708 based on charging rates of the energy tenders 704. For example, the power sources 710 may re-charge with electric energy at speeds that are dictated by the states of charge of the power sources 710, at speeds that are controlled or limited by the charging stations 804, and/or at speeds that are based on other factors (e.g., based on loads on the utility grid or system). The scheduling module 330 can determine the times at which energy tenders 704 are to couple or decouple from cargo vehicles 708 based on the charging rates so that the cargo vehicles 708 are not waiting at a location of an energy tender 704 while the energy tender 704 charges to a state needed to complete the next leg of a trip.

Movements of vehicle systems 702 can be coordinated with each other so that the vehicle systems 702 can share stored power with each other. For example, multiple vehicle systems 702 may be scheduled to travel in the same direction on the same route 806 (and optionally to remain no farther than a designated distance from each other) so that an energy tender 704 of one vehicle system 702 can decouple from that vehicle system 702. This energy tender 704 can then be moved by a cargo vehicle 708 or another vehicle to move to another vehicle system 702 and couple with this other vehicle system 702. This can occur for the energy tender 704 to provide additional energy to the other vehicle system 702.

The scheduling module 330 can determine which routes 806 are uni-directional routes and which routes 806 are bi-directional routes and create schedules based on this determination. A uni-directional route is a route 806 on which only a single vehicle or vehicle system can travel at a time, such as a single track of a rail network. A bi-directional route is a route 806 on which two vehicles or vehicle systems can travel, such as parallel tracks of a rail network, different lanes of a road, or the like. The coupling of vehicles 704, 708 with each other can be limited based on whether a uni-directional route is occupied, whether a bi-directional route is available, whether a longer transit time to travel a longer path over bi-directional routes allows for a vehicle system 702 to arrive and couple with an energy tender 704 at a desired time, etc.

The scheduling module 330 also can determine and use the bandwidth capacities of locations 802 in creating the schedules. For example, the scheduling module 330 can determine how many energy tenders 704 and/or cargo vehicles 708 can remain at a location 802 and create the schedules so that no more vehicles 704, 708 than the capacity of the location 802 are held at that location 802 at any time.

The time needed for energy tenders 704 to travel between locations 802 can be determined and used by the scheduling module 330 in creating the schedules. For example, if an energy tender 704 is needed at another location 802 from a current location 802 of the energy tender 704, the scheduling module 330 can factor in the transit time needed for the energy tender 704 to travel to the other location 802 in creating the schedule. This can involve the scheduling module 330 delaying arrival of the cargo vehicle 708 at the other location 802 until the energy tender 704 arrives at the other location 802 and/or is charged to at least a selected or designated state of charge.

Figure 9:
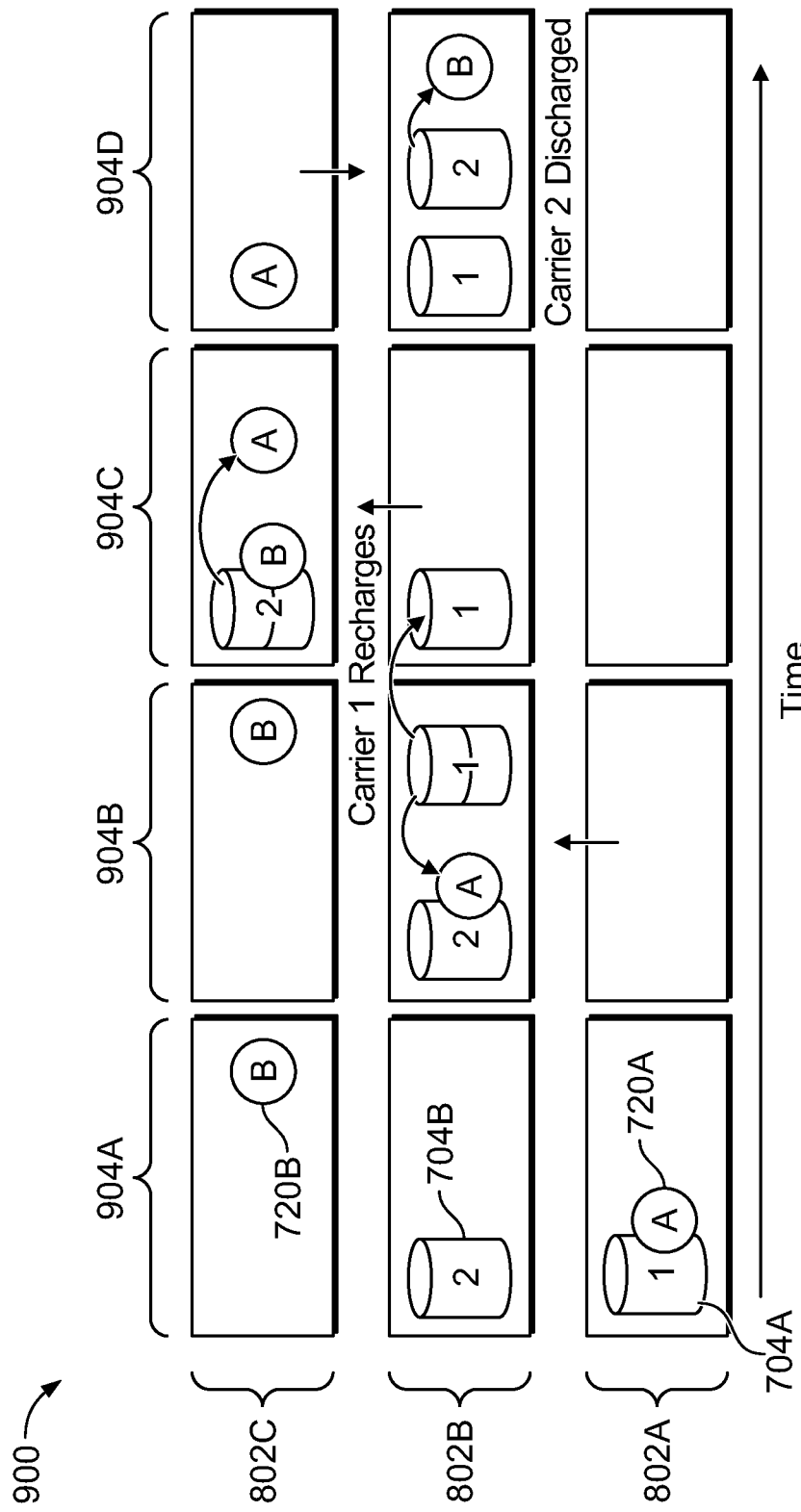
FIG. 9 illustrates one example of a movement schedule generated by the scheduling module shown in FIG. 3.

FIG. 9 illustrates one example of a movement schedule 900 generated by the scheduling module 330. This movement schedule 900 is shown as a grid or matrix with each row representing a different location 802 in the transportation network 800 and each column representing a different scheduled time 904A-D. In the illustrated example, the locations 802 are locations 802A, 802B, 802C, but optionally can be other locations in the transportation network 800. The scheduled times 904 are shown as scheduled times 904A-D, with the time 904A occurring before the time 904B, which occurs before the time 904C, which occurs before the time 904D.

The schedule 900 is established to move a first cargo 720 ("A" in FIG. 9) from the first location 802A to the third location 802C in the transportation network 800 and to move a second cargo 720 ("B" in FIG. 9) from the third location 802C to the second location 802B in the transportation network 800. The first cargo 720 can be referred to as the cargo 720A and the second cargo 720 can be referred to as the cargo 720B. In this example, the locations 802A, 802B are the same distance apart from each other as the locations 802B, 802C. As a result, the time needed for a vehicle system 702 formed by a single energy tender 704 and a single cargo vehicle 708 (carrying the cargo 720A or the cargo 720B) to travel from the location 802A to the location 802B is the same as each of (a) the time needed for the vehicle system 702 to travel from the location 802B to the location 802C, (b) the time needed for the vehicle system 702 to travel from the location 802C to the location 802B, and (c) the time needed for the vehicle system 702 to travel from the location 802B to the location 802A. Additionally, in the illustrated example, the amount of electric energy or fuel required to propel a vehicle system 702 formed from one energy tender 704 and one cargo vehicle 708 to move (a) from the location 802A to the location 802C, (b) from the location 802B to the location 802A or 802C and then back to the location 802B, (c) from the location 802C to the location 802B and then back to the location 802B, and so on, fully depletes the energy or fuel stored in the energy tender 704 having power sources 701 that are fully charged or full of fuel before beginning the trip.

The scheduling module 330 may determine that it takes one hour for a vehicle system 702 formed from a single energy tender 704 and a single cargo vehicle 708 between any two neighboring locations 802 (e.g., locations 802 that are not separated from each other by another location 802). The scheduling module 330 may be notified (e.g., from an operator, from a pre-existing delivery schedule, from a manifest document, etc.) that the cargo 720A is to be delivered to the location 802C (from the location 802A) in about (e.g., within 10%) two hours and the cargo 720B is to be delivered to the location 802B (from the location 802C) in about three hours. The scheduling module 330 also may be instructed or have a default requirement that at least one of the energy tenders 704 be fully charged or full of fuel at the completion of delivery of the cargo 720A, 720B for delivery of additional cargo 720.

Based on the locations of the cargo 720A, 720B and the energy tenders 704, the scheduling module 330 determines that an optimal schedule for delivery of the cargo 720A, 720B involves a cargo switch at location 802B. Specifically, at the first time 904A, a fully charged first energy tender 704A connects with and powers a first cargo vehicle 708A (having the cargo 720A onboard) in a first vehicle system 702 at the location 802A, a fully charged second energy tender 704B is located at the location 802B, and a second cargo vehicle 708B (having the cargo 720B onboard) is located at the location 802C. While the first energy tender 704A has enough stored energy to power the first cargo vehicle 708A to take the cargo 720A all the way to the scheduled destination location 802. But, doing this would incur the cost of charging or re-fueling the first energy tender 704A at the location 802C. This would result in the cargo 720B not being delivered to the location 802C on time. Instead, the scheduling module 330 directs the first energy tender 704A to power the first cargo vehicle 708A to take the cargo 720A from the location 802A to the location 802B (at time 904B, which is one hour after starting movement).

The first energy tender 704A is then separated from the first cargo vehicle 708A having the cargo 720A at the location 802B and the second energy tender 704B couples with the first cargo vehicle 708A. The second energy tender 704B then powers the first cargo vehicle 708A to take the cargo 720A from the location 802B to the location 802C from the time 904B to the time 904C to complete delivery of the cargo 720A. The power sources 710 onboard the first energy tender 704A fully recharge or re-fuel during the time between the times 904B, 904C (while the second energy tender 704B completes delivery of the cargo 720A).

The second energy tender 704B has half-charged or half depleted power sources 710 at the time 904C when the second energy tender 704B couples with the second cargo vehicle 708B. The second energy tender 704B then powers the second cargo vehicle 708B to take the second cargo 720B to the location 802B from the time 904C to the time 904D. The second energy tender 704B then arrives at the location 802B at or around the time 904D to deliver the cargo 720B at the location 802B. Additionally, the first energy tender 704A has fully charged or fully fueled power sources 710, as required.

Figure 10:
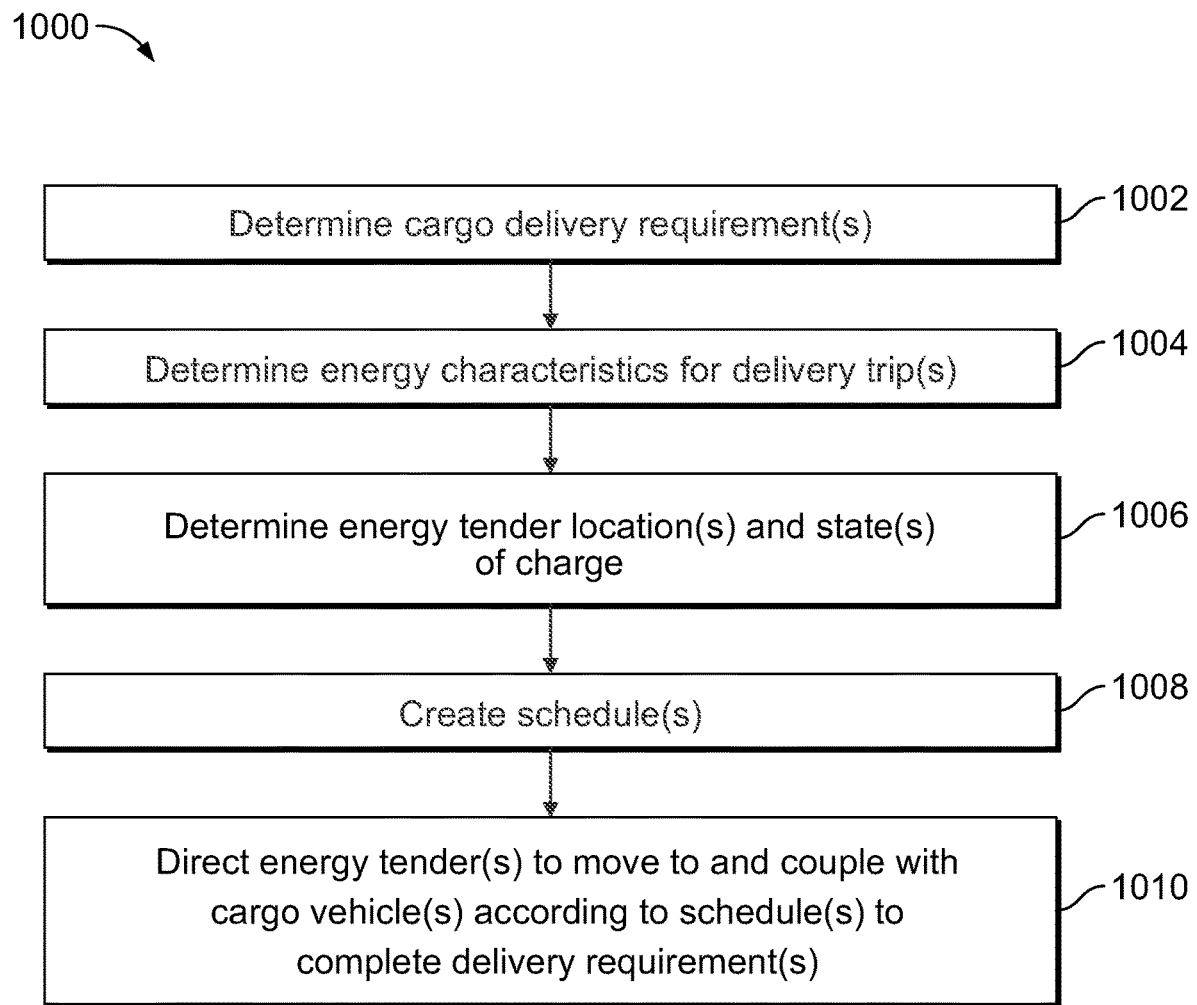
FIG. 10 illustrates a flowchart of one embodiment of a method for scheduling/controlling movements of energy tenders in a transportation network to provide for on-time delivery of cargo.

FIG. 10 illustrates a flowchart of one embodiment of a method 1000 for scheduling movements of energy tenders in a transportation network to provide for on-time delivery of cargo. Optionally, the flowchart can show a method 1000 for controlling the movements of the energy tenders in the transportation network to provide for on-time delivery of the cargo. The method 1000 can represent the operations or algorithm(s) performed by the scheduling module 330 to determine how or where to move energy tenders 704 in a transportation network 800 to ensure that the cargo vehicles 708 are powered to deliver cargo 720 on time (within designated time slots). At 1002, one or more cargo delivery requirements are determined. The cargo delivery requirements dictate which cargo 720 is to be delivered, where the cargo 720 is located, the location to where the cargo 720 is to be delivered, and when the cargo 720 is to be delivered (e.g., designated time slots for delivery of the cargo 720). Additional delivery requirements can include restrictions on which routes 806 can be traveled during delivery of the cargo 720. Some cargo 720 may be too fragile or susceptible to damage to travel on some routes 806 and some cargo 720 may contain hazardous material that is not legally permitted to travel on some portions of routes 806. The cargo delivery requirements can be input into the scheduling module 330 via the user interface 306 shown in FIG. 3, may be obtained by the scheduling module 330 from one or more trip manifests or delivery contracts, or the like.

At 1004, one or more energy characteristics for one or more trips to deliver the cargo are determined. The energy characteristics can represent how much energy is needed or will be needed to deliver the cargo 720 to the delivery or destination location(s) within the designated time slots. For example, the energy characteristics can include how quickly electric energy stored onboard an energy tender 704 will be depleted by powering a cargo vehicle 708 carrying the cargo 720 over one or more legs of the trip. This characteristic can be referred to as a depletion rate. The depletion rate optionally can represent how quickly fuel or other source of energy will be depleted by powering a cargo vehicle 708 carrying the cargo 720 over one or more legs of the trip. The scheduling module 330 can determine the depletion rate based on previous trips of the same or other energy tenders 704 and cargo vehicles 708 on the routes 806, based on characteristics of the routes 806 (e.g., grades, curvatures, etc.), characteristics of the cargo 720 (e.g., size, weight, mass, etc.), and/or weather conditions (e.g., wind direction and/or speed). For example, the scheduling module 330 can determine that the depletion rate is faster for uphill grades, curved routes 806, heavier and/or larger cargo, stronger headwinds, etc., and can determine that the depletion rate is slower for flatter or downhill grades, straighter routes 806, lighter and/or smaller cargo, weaker headwinds, stronger tailwinds, etc. Another energy characteristic can be how quickly the power sources 710 onboard energy tenders 704 can be re-charged or re-filled. This characteristic can be referred to as a recharging or replenishment rate, and can be determined based on locations of charging stations 804, rates at which the charging stations 804 can supply current or fuel to the power sources 710, downhill locations along the routes 806 where dynamic breaking can be used to recharge the power sources 710, etc.

The scheduling module 330 can determine how much energy is needed for a trip to deliver cargo 720 within the designated time slot based on the energy characteristics, as well as the current locations of the energy tenders 704, the current locations of the cargo vehicles 708, delivery locations, and/or the current locations of charging stations 804. The energy needed for a trip can increase for trips involving faster depletion rates, slower recharging rates, energy tenders 704 having to travel farther to couple with cargo vehicles 708, cargo vehicles 708 having to travel farther to deliver cargo 720, etc. The energy needed for a trip can decrease for trips involving slower depletion rates, faster recharging rates, energy tenders 704 having to travel shorter distances to couple with cargo vehicles 708, cargo vehicles 708 having to travel shorter distances to deliver cargo 720, etc. The energy needed for a trip can be referred to as an energy demand of a trip.

At 1006, the location of one or more of the energy tenders in the transportation network are determined. The locations of the energy tenders 704 can be determined by the vehicle control systems 712 onboard the energy tenders 704 communicating locations of the energy tenders 704 to the scheduling module 330 via the communication system 302. The state of charge of one or more of the energy tenders also may be determined. As described above, the vehicle control systems 712 can communicate the states of charge of the energy tenders 704 to the scheduling module 330 (e.g., via the communication system 302).

At 1008, the schedule for delivery of cargo by one or more vehicle systems formed from at least one energy tender and at least one cargo vehicle is determined. The schedules can be determined by the scheduling module 330 based on the cargo delivery requirements, the energy demands for the delivery trips, the locations of the energy tenders 704, the states of charge or fueling of the energy tenders 704, etc. As described above, the scheduling module 330 can determine the schedules that direct different energy tenders 704 to power cargo vehicles 708 over part, but not all, of a delivery trip before handing the cargo vehicle 708 to another energy tender 704, energy tenders 704 obtaining free rides to charging stations 804 or another location, different types of vehicles traveling with or in a vehicle system 702, vehicle systems 702 coupling to share power from the power sources 710, etc.

At 1010, one or more energy tenders are directed to be moved to and/or couple with cargo vehicles according to the determined schedules to complete delivery requirements. The scheduling module 330 can communicate control signals (e.g., via the communication system 302) to the vehicle control systems 712 of cargo vehicles 708. These control signals can direct the control systems 712 to autonomously (e.g., without operator intervention) control movement of the cargo vehicles 708 (as powered by the energy tenders 704) according to the schedules or can direct the control systems 712 to provide instructions to operators onboard the cargo vehicles 708 to direct the operators how to move the cargo vehicles 708 according to the schedules. The cargo vehicles 708 can then be powered by the energy tenders 704 to move according to the schedules so that the cargo 720 is or are delivered within the designated time slot(s) according to the schedules.

In an embodiment, a control system includes one or more processors. The one or more processors may be electrically coupled and/or otherwise in communication with (e.g., wireless communications) one or more communication devices, sensors, on-board vehicle control systems, etc. The one or more processors are configured to determine an energy demand associated with delivery of cargo in each of one or more trips from a starting location to a delivery location within a delivery time slot associated with the trip. The energy demand for each trip is representative of an amount of electric energy needed to move one or more cargo vehicles that carry the cargo in the trip from the starting location to the delivery location of the trip. For example, the amount of electric energy may be the amount of electric energy needed to power the one or more cargo vehicles to self-propel themselves to carry the cargo from the starting location to the delivery location. Alternatively or additionally, the amount of electric energy may be the amount of electric energy needed for one or more other vehicles (e.g., electric locomotives or other non-cargo carrying propulsion-generating vehicles) to move the one or more cargo vehicles from the starting location to the delivery location; for example, the one or more other vehicles may have on-board energy storage devices and/or fuel engines to provide sufficient energy to move themselves. Alternatively or additionally, the amount of electric energy may be the amount of electric energy needed for one or more other vehicles (e.g., electric locomotives or other non-cargo carrying propulsion-generating vehicles) to move both themselves and the one or more cargo vehicles from the starting location to the delivery location. (Either in a given consist or from a transportation network perspective, there may be a mix of self-propelling cargo vehicles, non-cargo carrying propulsion-generating vehicles with on-board energy storage/generation means, and non-cargo carrying propulsion-generating vehicles without on-board energy storage/generation means.) The one or more processors are also configured to determine a location of each of one or more energy tenders and a state of charge of each of the one or more energy tenders. The one or more processors are also configured to determine a schedule for at least one of the trips to deliver the cargo to the delivery location within the delivery time slot, the schedule determined based on the energy demand, the location of the one or more energy tenders, and the state of charge of the one or more energy tenders. The one or more processors are also configured to direct movement of one or more of the energy tenders to move (e.g., to be moved, or to move themselves) to a location of the one or more cargo vehicles (e.g., the energy tenders may be configured for self-propulsion, or they may be moved by other vehicles/means), couple (directly or indirectly) with the one or more cargo vehicles, and supply electric power from the one or more energy tenders for powering movement of the one or more cargo vehicles (e.g., power is supplied to the cargo vehicles to move, and/or to non-cargo carrying vehicles that move the cargo vehicles) along one or more routes to the delivery location of the trip within the designated time slot. In one aspect, movement of the energy tenders is directed for the energy tenders to self-propel to the location of the cargo vehicles, with the energy tenders providing electrical power to the cargo vehicles for the cargo vehicles to self-propel. In another aspect, the energy tenders may be pulled by other vehicles (cargo vehicles configured for both self-propulsion and to pull the energy tenders, or non-cargo carrying propulsion generating vehicles), and/or the energy tenders may provide electrical power to non-cargo carrying propulsion generating vehicles that pull the energy tenders and/or cargo vehicles.

In an embodiment, a control system includes one or more processors configured to determine an energy demand associated with delivery of cargo in each of one or more trips from a starting location to a delivery location within a delivery time slot associated with the trip. The energy demand for each trip is representative of an amount of electric energy needed to power one or more cargo vehicles that carry the cargo in the trip to self-propel the one or more cargo vehicles from the starting location to the delivery location of the trip. The one or more processors are also configured to determine a location of each of one or more energy tenders and a state of charge of each of the one or more energy tenders. The one or more processors are also configured to determine a schedule for at least one of the trips to deliver the cargo to the delivery location within the delivery time slot. The schedule is determined based on the energy demand, the location of the one or more energy tenders, and the state of charge of the one or more energy tenders. The one or more processors are also configured to direct self-propelled movement of one or more energy tenders to move to a location of the one or more cargo vehicles, couple with the one or more cargo vehicles, and supply electric power from the one or more energy tenders to the one or more cargo vehicles for powering the one or more cargo vehicles to self-propel along one or more routes to the delivery location of the trip within the designated time slot.

In one embodiment, a control system is provided that includes one or more processors configured to determine an energy demand associated with delivery of cargo in each of one or more trips from a starting location to a delivery location within a delivery time slot associated with the trip. The energy demand for each trip is representative of an amount of electric energy needed to move one or more cargo vehicles that carry the cargo in the trip from the starting location to the delivery location of the trip. The one or more processors are configured to determine a location of each of one or more energy tenders and a state of charge of each of the one or more energy tenders. The one or more processors also are configured to determine a schedule for the one or more cargo vehicles to deliver the cargo to the delivery location within the delivery time slot. The schedule is determined based on the energy demand, the location of the one or more energy tenders, and the state of charge of the one or more energy tenders. The one or more processors also are configured to direct which of the energy tenders that the one or more cargo vehicles are to couple with, be powered by, and move with for powering the cargo along one or more routes to the delivery location of the trip within the designated time slot.

Optionally, the energy demand for each trip can be representative of the amount of electric energy needed to self-propel the one or more cargo vehicles from the starting location to the delivery location of the trip while powered by one or more of the energy tenders.

Optionally, the one or more processors are configured to determine the schedule for at least one of the trips based on one or more of a charging rate at which an energy storage device onboard the one or more energy tenders is charged with electric energy, a depletion rate at which the electric energy stored in the energy storage device is discharged from the one or more energy tenders to power the one or more cargo vehicles to self-propel, and/or an amount of the electric energy that is supplied to the energy storage device onboard the one or more energy tenders from dynamic braking of at least one of the one or more energy tenders or the one or more cargo vehicles during the trip.

Optionally, the one or more energy tenders include plural energy tenders, and the one or more processors can be configured to determine the schedule to include which legs of at least one of the trips that different energy tenders of the plural energy tenders are to couple with and power the same cargo vehicle during the trip.

Optionally, the one or more processors can be configured to determine the schedule to dictate a location where the one or more energy tenders that are coupled with the one or more cargo vehicles are to stop for recharging an energy storage device onboard at least one of the energy tenders.

Optionally, the one or more processors can be configured to determine the schedule to direct the energy storage device onboard the one or more energy tenders to be recharged with just enough electric energy to power the one or more cargo vehicles to self-propel to complete the trip.

Optionally, the one or more processors can be configured to determine the schedule to direct the energy storage device onboard the one or more energy tenders to recharge while a state of charge of the energy storage device when the one or more energy tenders stop to recharge is enough to power the one or more cargo vehicles to self-propel to complete the trip.

Optionally, the one or more processors can be configured to determine the schedule to direct the energy storage device onboard the one or more energy tenders to recharge with just enough electric energy to power the one or more cargo vehicles to be powered to self-propel to reach a location of one or more additional energy tenders prior to completion of the trip.

Optionally, the one or more processors can be configured to determine the schedule to dictate a location where to replace at least one of the energy tenders coupled with the one or more cargo vehicles with one or more other energy tenders.

Optionally, the one or more processors can be configured to determine the schedule to replace the at least one energy tender with the one or more other energy tenders while the at least one energy tender has more than enough electric energy stored onboard the at least one energy tender to power the one or more cargo vehicles to complete the trip.

In one embodiment, a method is provided that includes determining an energy demand associated with delivery of cargo in each of one or more trips from a starting location to a delivery location within a delivery time slot associated with the trip. The energy demand for each trip is representative of an amount of electric energy needed to move one or more cargo vehicles that carry the cargo in the trip from the starting location to the delivery location of the trip. The method also includes determining a location of each of one or more energy tenders and a state of charge of each of the one or more energy tenders and determining a schedule for the one or more cargo vehicles to deliver the cargo to the delivery location within the delivery time slot. The schedule is determined based on the energy demand, the location of the one or more energy tenders, and the state of charge of the one or more energy tenders. The schedule directs which of the energy tenders that the one or more cargo vehicles are to couple with, be powered by, and move with for powering the cargo along one or more routes to the delivery location of the trip within the designated time slot. The method also includes directing movement of the one or more cargo vehicles according to the schedule.

Optionally, the energy demand that is determined can be representative of the amount of electric energy needed to self-propel the one or more cargo vehicles from the starting location to the delivery location of the trip while powered by one or more of the energy tenders.

Optionally, the schedule can be determined for at least one of the trips based on one or more of a charging rate at which an energy storage device onboard the one or more energy tenders is charged with electric energy, a depletion rate at which the electric energy stored in the energy storage device is discharged from the one or more energy tenders to power the one or more cargo vehicles to self-propel, and/or an amount of the electric energy that is supplied to the energy storage device onboard the one or more energy tenders from dynamic braking of at least one of the one or more energy tenders or the one or more cargo vehicles during the trip.

Optionally, the one or more energy tenders include plural energy tenders and the schedule is determined to one or more of dictate which legs of at least one of the trips that different energy tenders of the plural energy tenders are to couple with and power the same cargo vehicle during the trip, dictate a location where the one or more energy tenders that are coupled with the one or more cargo vehicles are to stop for recharging an energy storage device onboard at least one of the energy tenders, and/or dictate a location where to replace at least one of the energy tenders coupled with the one or more cargo vehicles with one or more other energy tenders.

Optionally, the schedule can be determined to direct the energy storage device onboard the one or more energy tenders to be recharged with just enough electric energy to power the one or more cargo vehicles to self-propel to complete the trip.

Optionally, the schedule can be determined to direct the energy storage device onboard the one or more energy tenders to recharge while a state of charge of the energy storage device when the one or more energy tenders stop to recharge is enough to power the one or more cargo vehicles to self-propel to complete the trip.

Optionally, the schedule can be determined to direct the energy storage device onboard the one or more energy genders to recharge with just enough electric energy to power the one or more cargo vehicles to be powered to self-propel to reach a location of one or more additional energy tenders prior to completion of the trip.

In one embodiment, a control system is provided that includes one or more processors configured to determine an energy demand associated with delivery of cargo in each of one or more trips to a delivery location within a delivery time slot associated with the trip. The energy demand for each trip is representative of an amount of electric energy needed to power one or more cargo vehicles that carry the cargo in the trip to self-propel the one or more cargo vehicles from the starting location to the delivery location of the trip. The one or more processors are configured to determine a location of each of one or more energy tenders and a state of charge of each of the one or more energy tenders. The one or more processors are configured to determine a schedule for at least one of the trips to deliver the cargo to the delivery location within the delivery time slot. The schedule is determined based on the energy demand of the at least one trip, the location of at least one of the energy tenders, and the state of charge of the at least one energy tender. The schedule includes a location where the one or more energy tenders that are coupled with the one or more cargo vehicles are to stop for recharging an energy storage device onboard at least one of the energy tenders. The one or more processors are configured to communicate the schedule to the one or more cargo vehicles to direct self-propelled movement of the one or more cargo vehicles to move to a location of the one or more energy tenders, couple with the one or more energy tenders, and receive electric power from the one or more energy tenders for powering the one or more cargo vehicles to self-propel along one or more routes to the delivery location of the trip within the designated time slot.

Optionally, the one or more processors can be configured to determine the schedule for at least one of the trips based on one or more of a charging rate at which an energy storage device onboard the one or more energy tenders is charged with electric energy, a depletion rate at which the electric energy stored in the energy storage device is discharged from the one or more energy tenders to power the one or more cargo vehicles to self-propel, and/or an amount of the electric energy that is supplied to the energy storage device onboard the one or more energy tenders from dynamic braking of at least one of the one or more energy tenders or the one or more cargo vehicles during the trip.

Optionally, the one or more processors can be configured to determine the schedule to one or more of direct the one or more energy tenders to recharge the energy storage device with just enough electric energy to power the one or more cargo vehicles to self-propel to complete the trip, direct the one or more energy tenders to recharge the energy storage device while a state of charge of the energy storage device when the one or more energy tenders stop to recharge is enough to power the one or more cargo vehicles to self-propel to complete the trip, and/or direct the one or more energy tenders to recharge the energy storage device with just enough electric energy to power the one or more energy tenders and the one or more cargo vehicles to self-propel to reach a location of one or more additional energy tenders prior to completion of the trip.

Optionally, the one or more processors can be configured to determine the schedule to dictate a location where at least one of the energy tenders that are coupled with the one or more cargo vehicles are to be replaced with one or more other energy tenders. The one or more processors can be configured to determine the schedule to direct the at least one energy tender to be replaced with the one or more other energy tenders while the at least one energy tender has more than enough electric energy stored onboard the at least one energy tender to power the one or more cargo vehicles to complete the trip.

As used herein, the terms "software" and "firmware" are interchangeable and include any computer program stored in memory for execution by a computer, including RAM memory, ROM memory, EPROM memory, EEPROM memory, and non-volatile RAM (NVRAM) memory. The above memory types are exemplary only and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, or the like). Similarly, the programs may be stand-alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A control system comprising:
one or more processors configured to determine an energy demand associated with delivery of cargo in one or more trips, the energy demand associated with the one or more trips representative of an amount of electric energy needed to move one or more cargo vehicles that carry the cargo in the one or more trips, the one or more processors configured to determine one or more locations of one or more energy tenders and one or more states of charge of the one or more energy tenders, the one or more processors configured to determine a schedule for the one or more cargo vehicles to deliver the cargo via the one or more trips based on the energy demand, the one or more locations of the one or more energy tenders, and the one or more states of charge of the one or more energy tenders, the one or more processors configured to direct which of the one or more energy tenders that the one or more cargo vehicles are to couple with, be powered by, and move with for powering transportation of the cargo along one or more routes for the one or more trips.

2. The control system of claim 1, wherein the energy demand represents the amount of electric energy needed to self-propel the one or more cargo vehicles through the one or more trips while powered by at least one of the energy tenders.

3. The control system of claim 1, wherein the one or more processors are configured to determine the schedule for a first trip of the one or more trips based on one or more of:
a charging rate at which an energy storage device onboard the one or more energy tenders is charged with electric energy,
a depletion rate at which the electric energy stored in the energy storage device is discharged from the one or more energy tenders to power the one or more cargo vehicles to self-propel, or
an amount of the electric energy that is supplied to the energy storage device onboard the one or more energy tenders from dynamic braking of at least one of the one or more energy tenders or the one or more cargo vehicles during the trip.

4. The control system of claim 1, wherein the one or more energy tenders include plural energy tenders, and the one or more processors are configured to determine the schedule to include which portions of the one or more trips that different energy tenders of the plural energy tenders are to couple with and power the same cargo vehicle during the one or more trips.

5. The control system of claim 1, wherein the one or more processors are configured to determine the schedule to dictate a location where the one or more energy tenders that are coupled with the one or more cargo vehicles are to stop for recharging an energy storage device onboard at least one of the energy tenders.

6. The control system of claim 1, wherein the one or more processors are configured to determine the schedule to direct an energy storage device onboard the one or more energy tenders to be recharged with just enough electric energy to power the one or more cargo vehicles to self-propel to complete the one or more trips.

7. The control system of claim 1, wherein the one or more processors are configured to determine the schedule to direct an energy storage device onboard the one or more energy tenders to recharge while a state of charge of the energy storage device while the one or more energy tenders stop to recharge is enough to power the one or more cargo vehicles to self-propel to complete the one or more trips.

8. The control system of claim 1, wherein the one or more processors are configured to determine the schedule to direct an energy storage device onboard the one or more energy tenders to recharge with just enough electric energy to power the one or more cargo vehicles to be powered to self-propel to reach a location of one or more additional energy tenders prior to completion of the one or more trips.

9. The control system of claim 1, wherein the one or more processors are configured to determine the schedule to dictate a location where to replace at least one of the energy tenders coupled with the one or more cargo vehicles with one or more other energy tenders.

10. The control system of claim 9, wherein the one or more processors are configured to determine the schedule to replace the at least one energy tender with the one or more other energy tenders while the at least one energy tender has more than enough electric energy stored onboard the at least one energy tender to power the one or more cargo vehicles to complete the one or more trips.

11. A method comprising:
determining an energy demand associated with delivery of cargo in one or more trips, the energy demand for the one or more trips representative of an amount of electric energy needed to move one or more cargo vehicles that carry the cargo in the one or more trips;
determining one or more locations of one or more energy tenders and one or more states of charge the one or more energy tenders;
determining a schedule for the one or more cargo vehicles to deliver the cargo based on the energy demand, the one or more locations of the one or more energy tenders, and the one or more states of charge of the one or more energy tenders, the schedule directing which of the one or more energy tenders that the one or more cargo vehicles are to couple with, be powered by, and move with for powering transportation of the cargo during the one or more trips; and
directing movement of the one or more cargo vehicles according to the schedule.

12. The method of claim 11, wherein the energy demand that is determined represents the amount of electric energy needed to self-propel the one or more cargo vehicles during the one or more trips while powered by the one or more energy tenders.

13. The method of claim 11, wherein the schedule is determined for a first trip of the one or more trips based on one or more of:
a charging rate at which an energy storage device onboard the one or more energy tenders is charged with electric energy,
a depletion rate at which the electric energy stored in the energy storage device is discharged from the one or more energy tenders to power the one or more cargo vehicles to self-propel, or
an amount of the electric energy that is supplied to the energy storage device onboard the one or more energy tenders from dynamic braking of at least one of the one or more energy tenders or the one or more cargo vehicles during the one or more trips.

14. The method of claim 11, wherein the one or more energy tenders include plural energy tenders, and wherein the schedule is determined to one or more of:
dictate which legs of the one or more trips that different energy tenders of the plural energy tenders are to couple with and power the one or more cargo vehicles during the trip,
dictate a location where the one or more energy tenders that are coupled with the one or more cargo vehicles are to stop for recharging an energy storage device onboard the one or more energy tenders, or dictate a location where to replace at least one of the energy tenders coupled with the one or more cargo vehicles with one or more other energy tenders.

15. The method of claim 11, wherein the schedule is determined to direct an energy storage device onboard the one or more energy tenders to be recharged with just enough electric energy to power the one or more cargo vehicles to self-propel to complete the one or more trips.

16. The method of claim 11, wherein the schedule is determined to direct an energy storage device onboard the one or more energy tenders to recharge while a state of charge of the energy storage device while the one or more energy tenders stop to recharge is enough to power the one or more cargo vehicles to self-propel to complete the one or more trips.

17. The method of claim 11, wherein the schedule is determined to direct an energy storage device onboard the one or more energy tenders to recharge with just enough electric energy to power the one or more cargo vehicles to be powered for self-propulsion to reach a location of one or more additional energy tenders prior to completion of the one or more trips.

18. A control system comprising:
one or more processors configured to determine an energy demand associated with delivery of cargo by one or more cargo vehicles,
the one or more processors configured to determine a location of one or more energy tenders and a state of charge of the one or more energy tenders,
the one or more processors configured to determine a schedule for delivery of the cargo based on the energy demand, the location of the one or more energy tenders, and the state of charge of the one or more energy tenders, the schedule including a location where the one or more energy tenders that are coupled with the one or more cargo vehicles are to stop for recharging an energy storage device onboard the one or more energy tenders, and
the one or more processors configured to communicate the schedule to the one or more cargo vehicles to direct self-propelled movement of the one or more cargo vehicles to move to a location of the one or more energy tenders, couple with the one or more energy tenders, and receive electric power from the one or more energy tenders for powering the one or more cargo vehicles to self-propel for delivery of the cargo.

19. The control system of claim 18, wherein the one or more processors are configured to determine the schedule based on one or more of:
a charging rate at which the energy storage device onboard the one or more energy tenders is charged with electric energy,
a depletion rate at which the electric energy stored in the energy storage device is discharged from the one or more energy tenders, or
an amount of the electric energy that is supplied to the energy storage device onboard the one or more energy tenders from dynamic braking of at least one of the one or more energy tenders or the one or more cargo vehicles.

20. The control system of claim 18, wherein the one or more processors are configured to determine the schedule to one or more of:
direct the one or more energy tenders to recharge the energy storage device with just enough electric energy to power the one or more cargo vehicles to self-propel to complete delivery of the cargo,
direct the one or more energy tenders to recharge the energy storage device while a state of charge of the energy storage device when the one or more energy tenders stop to recharge is enough to power the one or more cargo vehicles to self-propel to complete delivery of the cargo, or
direct the one or more energy tenders to recharge the energy storage device with just enough electric energy to power the one or more energy tenders and the one or more cargo vehicles to self-propel to reach a location of one or more additional energy tenders prior to completion of delivery of the cargo.

* * * * *